United States Patent
Blankenship et al.

(10) Patent No.: US 12,273,879 B2
(45) Date of Patent: Apr. 8, 2025

(54) SYSTEMS AND METHODS OF SIGNALING TIME DOMAIN RESOURCE ALLOCATION FOR PDSCH TRANSMISSION

(71) Applicant: Telefonaktiebolaget LM Ericsson (publ), Stockholm (SE)

(72) Inventors: Yufei Blankenship, Kildeer, IL (US); Mattias Frenne, Uppsala (SE); Kittipong Kittichokechai, Järfälla (SE); Siva Muruganathan, Stittsville (CA); Jianwei Zhang, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 257 days.

(21) Appl. No.: 17/773,083

(22) PCT Filed: Oct. 30, 2020

(86) PCT No.: PCT/IB2020/060229
§ 371 (c)(1),
(2) Date: Apr. 29, 2022

(87) PCT Pub. No.: WO2021/084504
PCT Pub. Date: May 6, 2021

(65) Prior Publication Data
US 2023/0300834 A1    Sep. 21, 2023

Related U.S. Application Data

(60) Provisional application No. 62/929,611, filed on Nov. 1, 2019.

(51) Int. Cl.
*H04W 72/1273* (2023.01)
*H04W 72/11* (2023.01)
(Continued)

(52) U.S. Cl.
CPC ........ *H04W 72/1273* (2013.01); *H04W 72/11* (2023.01); *H04W 72/23* (2023.01); *H04W 76/20* (2018.02)

(58) Field of Classification Search
None
See application file for complete search history.

(56) References Cited

U.S. PATENT DOCUMENTS

| | | | | |
|---|---|---|---|---|
| 2019/0363843 | A1* | 11/2019 | Gordaychik | H04L 1/08 |
| 2020/0382174 | A1* | 12/2020 | Shao | H04B 7/0456 |
| 2021/0368517 | A1* | 11/2021 | Chen | H04L 5/0023 |

OTHER PUBLICATIONS

Author Unknown, "Technical Speccification Group Radio Access Network; NR; Physical layer procedures for control (Release 15)," Technical Specification 38.213, Version 15.7.0, Sep. 2019, 3GPP Organizational Partners, 108 pages.

(Continued)

*Primary Examiner* — Christine T Duong
(74) *Attorney, Agent, or Firm* — Withrow & Terranova, PLLC

(57) ABSTRACT

A method performed by a wireless device for determining a start symbol of a plurality of PDSCH transmission occasions using a relative reference symbol includes: receiving an indication that includes indications: that enable/disable the use of the relative reference symbol; the offset between the last symbol of a first PDSCH and the first symbol of a second PDSCH; that there are multiple PDSCH transmission occasions; and that a symbol of the first transmission occasion and length corresponding to all transmission occasions; and determining the symbol at which each of the plurality of PDSCH transmission occasions end which will be used to determine the start symbol of the next PDSCH transmission occasion. In this way, the wireless device behavior is defined on how many PDSCH repetitions the wireless device can (Continued)

receive when the use of the new relative reference for the starting symbol of the first PDSCH repetition is enabled.

25 Claims, 20 Drawing Sheets

(51) Int. Cl.
   *H04W 72/23* (2023.01)
   *H04W 76/20* (2018.01)

(56) References Cited

OTHER PUBLICATIONS

Author Unknown, "Technical Speccification Group Radio Access Network; NR; Physical layer procedures for data (Release 15)," Technical Specification 38.214, Version 15.7.0, Sep. 2019, 3GPP Organizational Partners, 106 pages.

Author Unknown, "Technical Specification Group Radio Access Network; NR; Radio Resource Control (RRC) protocol specification (Release 15)," Technical Specification 38.331, Version 15.7.0, Sep. 2019, 3GPP Organizational Partners, 527 pages.

Ericsson, "R4-191xxx: UE measurements for OTDOA," 3GPP TSG-RAN WG4 Meeting #93, Nov. 18-22, 2019, Reno, Nevada, 7 pages.

Huawei, et al., "R1-1906609: DCI design for URLLC," 3GPP TSG RAN WG1 Meeting #97, May 13-17, 2019, Reno, Nevada, 7 pages.

MCC Support, "R1-191xxx: Draft Report of 3GPP TSG RAN WG1 #98bis v0.1.0 (Chongqing, China, Oct. 14-20, 2019)," 3GPP TSG RAN WG1 Meeting #99, Nov. 18-22, 2019, Reno, Nevada, 146 pages.

Invitation to Pay Additional Fees and Partial Search for International Patent Application No. PCT/IB2020/060229, mailed Feb. 8, 2021, 17 pages.

International Search Report and Written Opinion for International Patent Application No. PCT/IB2020/060229, mailed Mar. 30, 2021, 20 pages.

ETRI, "R1-1900686: Potential PDCCH enhancements for NR URLLC," 3GPP TSG RAN WG1 Ad-Hoc Meeting 1901, Jan. 21-25, 2019, Taipei, Taiwan, 6 pages.

Huawei, "R1-1907663: Summary of 7.2.6.1 PDCCH enhancements," 3GPP TSG RAN WG1 Meeting #97, May 13-17, 2019, Reno, Nevada, 58 pages.

Panasonic, "R1-1910989: PDCCH enhancements for NR URLLC," 3GPP TSG RAN WG1 #98bis, Oct. 14-20, 2019, Chongqing, China, 8 pages.

Examination Report for European Patent Application No. 20803944. 6, mailed Oct. 31, 2024, 14 pages.

\* cited by examiner

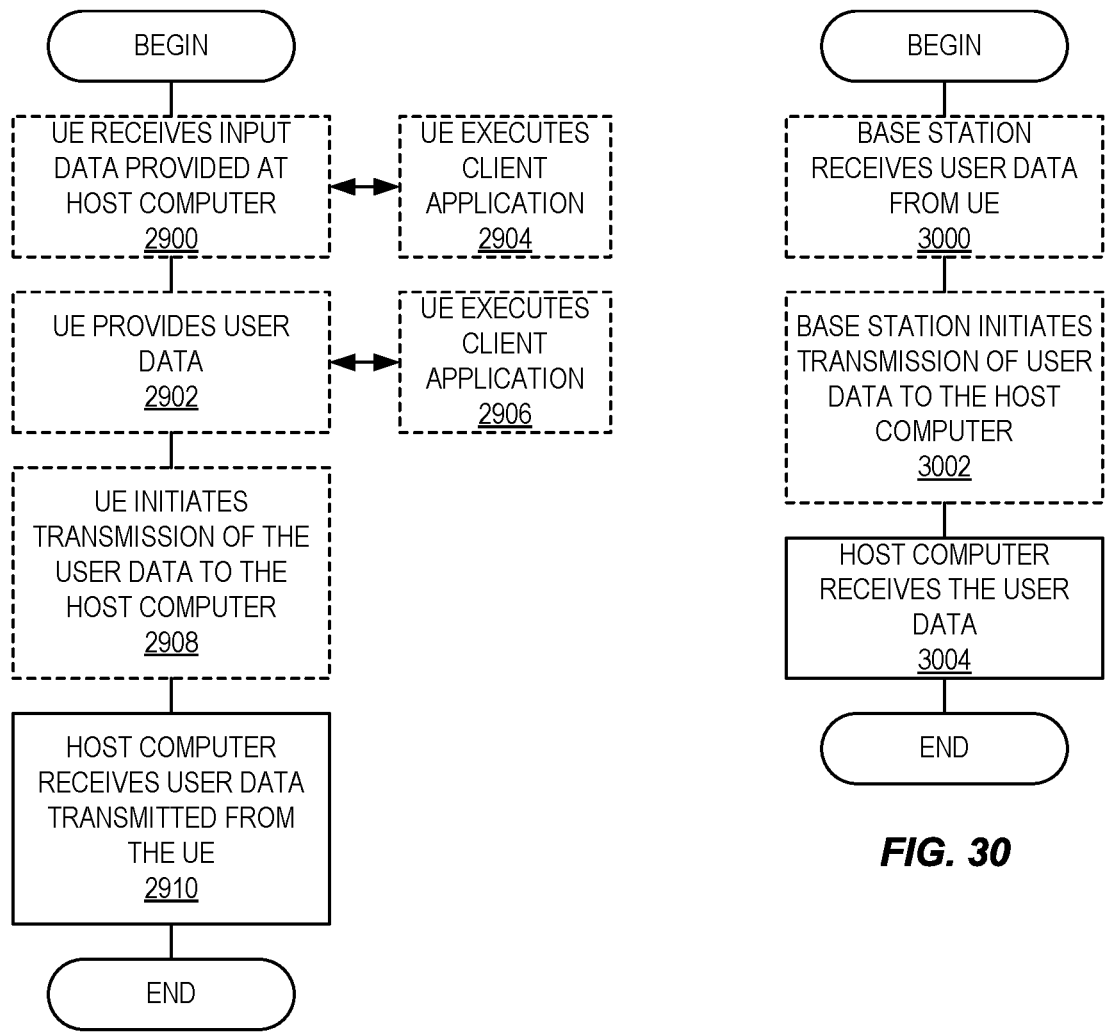

SYSTEMS AND METHODS OF SIGNALING TIME DOMAIN RESOURCE ALLOCATION FOR PDSCH TRANSMISSION

RELATED APPLICATIONS

This application is a 35 U.S.C. § 371 national phase filing of International Application No. PCT/IB2020/060229, filed Oct. 30, 2020, which claims the benefit of provisional patent application Ser. No. 62/929,611, filed Nov. 1, 2019, the disclosures of which are hereby incorporated herein by reference in their entireties.

TECHNICAL FIELD

The present disclosure relates to signaling Time Domain Resource Allocation (TDRA).

BACKGROUND

The new generation mobile wireless communication system (5G) or New Radio (NR) supports a diverse set of use cases and a diverse set of deployment scenarios. NR uses Cyclic Prefix Orthogonal Frequency Division Multiplexing (CP-OFDM) in the downlink (i.e., from a network node, New Radio Base Station (gNB), evolved or enhanced NodeB (eNB), or base station, to a user equipment or UE) and both CP-OFDM and DFT-spread OFDM (DFT-S-OFDM) in the uplink (i.e., from UE to gNB). In the time domain, NR downlink and uplink physical resources are organized into equally-sized subframes of 1 ms each. A subframe is further divided into multiple slots of equal duration.

The slot length depends on subcarrier spacing. For subcarrier spacing of $\Delta f=15$ kHz, there is only one slot per subframe, and each slot always consists of 14 OFDM symbols, irrespective of the subcarrier spacing.

Typical data scheduling in NR occurs on a per slot basis. FIG. 1 illustrates a NR time-domain structure with 15 kHz subcarrier spacing. An example is shown in FIG. 1 where the first two symbols contain a Physical Downlink Control Channel (PDCCH) and the remaining 12 symbols contain Physical Data Channels (PDCHs), either a Physical Downlink Data Channel (PDSCH) or Physical Uplink Data Channel (PUSCH).

Different subcarrier spacing values are supported in NR. The supported Subcarrier Spacing (SCS) values (also referred to as different numerologies) are given by $\Delta f=(15 \times 2^{\alpha})$ kHz where $\alpha \in (0,1,2,4,8)$. $\Delta f=15$ kHz is the basic subcarrier spacing that is also used in LTE, the corresponding slot duration is 1 ms. For a given SCS, the corresponding slot duration is $$\frac{1}{2^{\alpha}}$$

ms.

In the frequency domain physical resource definition, a system bandwidth is divided into resource blocks (RBs); each corresponds to 12 contiguous subcarriers. The basic NR physical time-frequency resource grid is illustrated in FIG. 2, where only one Resource Block (RB) within a 14-symbol slot is shown. One OFDM subcarrier during one OFDM symbol interval forms one Resource Element (RE).

Downlink transmissions can be dynamically scheduled, i.e., in each slot the gNB transmits Downlink Control Information (DCI) over the PDCCH about which UE data is to be transmitted to and which RBs and OFDM symbols in the current downlink slot the data is transmitted on. PDCCH is typically transmitted in the first one or two OFDM symbols in each slot in NR. The UE data are carried on PDSCH. A UE first detects and decodes PDCCH, and if the decoding is successful, it then decodes the corresponding PDSCH based on the decoded control information in the PDCCH.

Uplink data transmission can also be dynamically scheduled using PDCCH. Similar to downlink, a UE first decodes uplink grants in PDCCH and then transmits data over PUSCH based the decoded control information in the uplink grant such as modulation order, coding rate, uplink resource allocation, etc.

RRC Configuration of Number of Repetitions in Rel-15

In NR Rel-15, slot-aggregation is supported both for Downlink (DL) and Uplink (UL) transmissions, which is beneficial for enhancing the coverage and improved reliability. In this case, the PDSCH and PUSCH transmissions can be repeated in multiple slots when the Radio Resource Control (RRC) parameter for slot aggregation is configured. The corresponding RRC parameter is referred to as PDSCH-AggregationFactor, PUSCH-AggregationFactor, repK for PDSCH, grant based PUSCH and grant-free PUSCH, respectively. The relevant Information Elements (IEs) in the RRC signalling from TS 38.331 are listed below to illustrate the usage of these parameters.

| PDSCH-Config information element |  |
|---|---|
| -- ASN1START<br>-- TAG-PDSCH-CONFIG-START<br>PDSCH-Config ::= | SEQUENCE { |
| ... |  |
| resourceAllocation | ENUMERATED { resourceAllocationType0, |
| resourceAllocationType1, dynamicSwitch}, |  |
| pdsch-TimeDomainAllocationList | SetupRelease { PDSCH- |
| TimeDomainResourceAllocationList } | OPTIONAL, -- Need M |
| pdsch-AggregationFactor | ENUMERATED { n2, n4, n8 } |
| ... |  |
| } |  |

| PUSCH-Config information element |  |
|---|---|
| PUSCH-Config ::= | SEQUENCE { |
| ... |  |
| resourceAllocation | ENUMERATED { resourceAllocationType0, |
| resourceAllocationType1, dynamicSwitch}, |  |

-continued

| pusch-TimeDomainAllocationList TimeDomainResourceAllocationList } pusch-AggregationFactor | SetupRelease { PUSCH-OPTIONAL, -- Need M ENUMERATED { n2, n4, n8 } OPTIONAL, -- Need S |
|---|---|

...
}

| ConfiguredGrantConfig information element | |
|---|---|
| ConfiguredGrantConfig ::= | SEQUENCE { |
| ... | |
| repK | ENUMERATED {n1, n2, n4, n8}, |
| ... | |
| } | |

When a UE is scheduled by DL assignment or DL Semi-Persistent Scheduling (SPS) for PDSCH transmission in a given slot, the signalled resource allocation for the PDSCH is used for a number of consecutive slots if the aggregation factor is configured with a value larger than 1. In this case, the PDSCH is repeated with different redundancy versions in those slots for transmission of the corresponding transport blocks (TBs). The same procedure is applied for UL where a UE is scheduled by UL assignment or grant-free for PUSCH transmission in a slot and is configured for slot aggregations. In this case, the UE uses the signalled resource allocation in the number of slots given by the aggregation factors using different redundancy versions for the transmission of corresponding TBs. The redundancy version to be applied on the $n^{th}$ transmission occasion of the TB is determined according to table below, where $rv_{id}$ is the RV identity number.

TABLE 5.1.2.1-2

Applied redundancy version when PDSCH-AggregationFactor is present

| $rv_{id}$ indicated by the DCI scheduling the PDSCH | $rv_{id}$ to be applied to $n^{th}$ transmission occasion | | | |
|---|---|---|---|---|
| | n mod 4 = 0 | n mod 4 = 1 | n mod 4 = 2 | n mod 4 = 3 |
| 0 | 0 | 2 | 3 | 1 |
| 2 | 2 | 3 | 1 | 0 |
| 3 | 3 | 1 | 0 | 2 |
| 1 | 1 | 0 | 2 | 3 |

In NR Rel-16, proposals for indicating the number of repetitions in DCI are currently being discussed. Some proposals in NR Rel-16 include indicating the number of repetitions in a newly introduced DCI field. Some other proposals in NR Rel-16 include indicating the number of repetitions using an existing DCI field such as Time Domain Resource Allocation (TDRA) field.

PDSCH Mapping Type A and B

A feature to support a physical layer with very low latency is introduced in NR with the possibility to schedule a very short PDSCH or PUSCH transmission, much shorter than the slot duration. Hence, both slot based and non-slot based scheduling is specified in NR, where slot based (known as PDSCH mapping Type A) resembles LTE, where PDSCH starts in the beginning of the slot and can end at the end of the slot or earlier. Non-slot based scheduling (known as PDSCH Type B) can span 2, 4 or 7 OFDM symbols in NR Rel.15 and can basically start and end anywhere in a slot (as long as a transmission does not cross the slot boundary). See Table 1 about scheduling Types A and B and the supported length in number of symbols, of these scheduling types.

TABLE 1

Possible scheduling types in NR for PDSCH and PUSCH and their positions in the slot where it has been assumed in this table that symbol 1 is the first symbol in the slot.

| Scheduling Type | Start symbol in slot | Length in symbols |
|---|---|---|
| PDSCH Type A | 1, 2, 3 or 4 | 3-14 |
| PDSCH Type B | 1-13 | 2, 4, 7 |
| PUSCH Type A | 1 | 4-14 |
| PUSCH Type B | 1-14 | 1-14 |

TDRA in NR Rel-15

In NR Rel-15, the TDRA information for a PDSCH transmission in a slot includes information such that the UE can determine the slot where the PDSCH is expected to be received (a.k.a. K0 parameter which is the slot offset for PDSCH, relative the PDCCH), the starting symbol in the slot for PDSCH reception and the length or duration of PDSCH reception (a.k.a. Start and Length Indicator (SLIV)). The UE is also provided, from the TDRA, with the mapping type (type A or B) which together with other RRC configured parameters is used to determine the Demodulated Reference Signal (DMRS) positions within the scheduled PDSCH duration.

In NR, there are TDRA tables specified consisting of different combinations of K0, SLIV, etc. The UE can be signaled by an index to a row in the table that provides information on K0 and SLIV and mapping type to be used for PDSCH reception.

The similar procedure is applied for PUSCH transmissions where the slot intended for PUSCH transmission is obtained from a field in a UL assignment, given by K2, which is the parameter name for the slot offset for PUSCH, relative to the PDCCH. The SLIV information for PUSCH transmission is provided to the UE in the DCI, similarly to PDSCH reception as well as the mapping type by UL assignment and/or configuration.

In case of repetition, the TDRA is the time domain resource allocation for the first instance of repetitive PDSCH reception or PUSCH transmissions. As mentioned previously, if the UE is configured with the aggregation factor by RRC signaling, the transmission in that slot is repeated in multiple slots based on the aggregation factor.

The relevant Information Elements (IEs) in the RRC signaling from TS 38.331 are listed below to illustrate the usage of these parameters.

| PDSCH-TimeDomainResourceAllocationList information element |
| --- |
| -- ASN1START<br>-- TAG-PDSCH-TIMEDOMAINRESOURCEALLOCATIONLIST-START<br>PDSCH-TimeDomainResourceAllocationList ::=     SEQUENCE (SIZE(1..maxNrofDL-<br>Allocations)) OF PDSCH-TimeDomainResourceAllocation<br>PDSCH-TimeDomainResourceAllocation ::=     SEQUENCE {<br>  k0                           INTEGER(0..32)           OPTIONAL,   -- Need<br>  mapping Type                 ENUMERATED {typeA, typeB},<br>  startSymbolAndLength         INTEGER (0..127)<br>}<br>-- TAG-PDSCH-TIMEDOMAINRESOURCEALLOCATIONLIST-STOP<br>-- ASN1STOP |

| PDSCH-TimeDomainResourceAllocation field descriptions |
| --- |
| k0<br>The n1 corresponds to the value 1; n2 corresponds to value 2, and so on.<br>Corresponds to L1 parameter 'K0' (see 38.214, section 5.1.2.1) When the field is<br>absent the UE applies the value 0.<br>mappingType<br>PDSCH mapping type. (see 38.214, section 5.3)<br>startSymbolAndLength<br>An index giving valid combinations of start symbol and length (jointly encoded) as<br>start and length indicator (SLIV). The network configures the field so that the<br>allocation does not cross the slot boundary.<br>Corresponds to L1 parameter 'Index-start-len' (see 38.214, section 5.1.2.1) |

QCL and TCI States

Several signals can be transmitted from the same base station antenna from different antenna ports. These signals can have the same large-scale properties, for instance in terms of Doppler shift/spread, average delay spread, or average delay. These antenna ports are then said to be quasi co-located (QCL).

The network can then signal to the UE that two antenna ports are QCL. If the UE knows that two antenna ports are QCL with respect to a certain parameter (e.g., Doppler spread), the UE can estimate that parameter based on one of the antenna ports and use that estimate when receiving the other antenna port. Typically, the first antenna port is represented by a measurement reference signal such as CSI-RS (known as source Reference Signal (RS)) and the second antenna port is a demodulation reference signal (DMRS) (known as target RS).

For instance, if antenna ports A and B are QCL with respect to average delay, the UE can estimate the average delay from the signal received from antenna port A (known as the source reference signal (RS)) and assume that the signal received from antenna port B (target RS) has the same average delay. This is useful for demodulation since the UE can know beforehand the properties of the channel when trying to measure the channel utilizing the DMRS.

Information about what assumptions can be made regarding QCL is signaled to the UE from the network. In NR, four types of QCL relations between a transmitted source RS and transmitted target RS were defined:

Type A: {Doppler shift, Doppler spread, average delay, delay spread}
Type B: {Doppler shift, Doppler spread}
Type C: {average delay, Doppler shift}
Type D: {Spatial Rx parameter}

QCL type D was introduced to facilitate beam management with analog beamforming and is known as spatial QCL. There is currently no strict definition of spatial QCL, but the understanding is that if two transmitted antenna ports are spatially QCL, the UE can use the same Rx beam to receive them. Note that for beam management, the discussion mostly revolves around QCL Type D, but it is also necessary to convey a Type A QCL relation for the RSs to the UE so that it can estimate all the relevant large scale parameters.

Typically this is achieved by configuring the UE with a CSI-RS for tracking (TRS) for time/frequency offset estimation. To be able to use any QCL reference, the UE would have to receive it with a sufficiently good Signal to Interference plus Noise Ratio (SINR). In many cases, this means that the TRS has to be transmitted in a suitable beam to a certain UE.

To introduce dynamics in beam and transmission point (TRP) selection, the UE can be configured through RRC signaling with N TCI states, where N is up to 128 in frequency range 2 (FR2) and up to 8 in FR1, depending on UE capability.

Each TCI state contains QCL information, i.e., one or two source DL RSs, each source RS associated with a QCL type. For example, a TCI state contains a pair of reference signals, each associated with a QCL type, e-g—two different CSI-RSs {CSI-RS1, CSI-R52} is configured in the TCI state as {qcl-Type1,qcl-Type2}={Type A, Type D}. It means the UE can derive Doppler shift, Doppler spread, average delay, delay spread from CSI-RS1 and Spatial Rx parameter (i.e., the RX beam to use) from CSI-RS2. In case type D (spatial information) is not applicable, such as low or midband operation, then a TCI state contains only a single source RS.

Each of the N states in the list of TCI states can be interpreted as a list of N possible beams transmitted from the network or a list of N possible TRPs used by the network to communicate with the UE.

A first list of available TCI states is configured for PDSCH, and a second list for PDCCH contains pointers, known as TCI State IDs, to a subset of the TCI states configured for PDSCH. The network then activates one TCI state for PDCCH (i.e., provides a TCI for PDCCH) and up to M active TCI states for PDSCH. The number M of active TCI states the UE can support is a UE capability but the maximum in NR Rel-15 is 8.

Each configured TCI state contains parameters for the quasi co-location associations between source reference signals (CSI-RS or Synchronization Signal (SS)/PBCH) and target reference signals (e.g., PDSCH/PDCCH DMRS ports). TCI states are also used to convey QCL information for the reception of CSI-RS.

Assume a UE is configured with 4 active TCI states (from a list of totally 64 configured TCI states). Hence, 60 TCI states are inactive and the UE need not be prepared to have large scale parameters estimated for those. But the UE continuously tracks and updates the large-scale parameters for the 4 active TCI states by measurements and analysis of the source RSs indicated by each TCI state.

In NR Rel-15, when scheduling a PDSCH to a UE, the DCI contains a pointer to one active TCI. The UE then knows which large-scale parameter estimate to use when performing PDSCH DMRS channel estimation and thus PDSCH demodulation.

DMRS

Demodulation Reference Signals (DMRS) are used for coherent demodulation of physical layer data channels, PDSCH (DL) and PUSCH (UL), as well as of physical layer downlink control channel PDCCH. The DMRS is confined to resource blocks carrying the associated physical layer channel and is mapped on allocated resource elements of the OFDM time-frequency grid such that the receiver can efficiently handle time/frequency-selective fading radio channels.

The mapping of DMRS to resource elements is configurable in both frequency and time domain, with two mapping types in the frequency domain (configuration type 1 or type 2) and two mapping types in the time domain (mapping type A or type B) defining the symbol position of the first DMRS within a transmission interval. The DMRS mapping in time domain can further be single-symbol based or double-symbol based where the latter means that DMRS is mapped in pairs of two adjacent symbols. Furthermore, a UE can be configured with one, two, three, or four single-symbol DMRSs and one or two double-symbol DMRSs. In scenarios with low Doppler, it may be sufficient to configure front-loaded DMRSs only, i.e., one single-symbol DMRS or one double-symbol DMRS, whereas in scenarios with high Doppler, additional DMRSs will be required.

FIG. 3 shows the mapping of a front-loaded DMRS for configuration type 1 and type 2 with single-symbol and double-symbol DMRS and for the mapping type A with first DMRS in third symbol of a transmission interval of 14 symbols. FIG. 3 shows that type 1 and type 2 differ with respect to both the mapping structure and the number of supported DMRS Code Division Multiplexing (CDM) groups where type 1 supports 2 CDM groups and Type 2 supports 3 CDM groups.

A DMRS antenna port is mapped to the resource elements within one CDM group only. For a single-symbol DMRS, two antenna ports can be mapped to each CDM group, whereas for a double-symbol DMRS, four antenna ports can be mapped to each CDM group. Hence, the maximum number of DMRS ports is for type 1 either four or eight, and for type 2 it is either six or twelve. An orthogonal cover code (OCC) of length 2 ([+1, +1], [+1, −1]) is used to separate antenna ports mapped on same resource elements within a CDM group. The OCC is applied in frequency domain as well as in time domain when the double-symbol DMRS is configured.

Ultra-Reliable and Low Latency (URLLC) NR

In NR Rel.16, there are ongoing specifications enhancement for ultra-reliable and low latency communication with packet error rates down to $10^{-5}$. For these services, an alternative Modulation and Coding Scheme (MCS) table can be configured to be used for PDSCH or PUSCH scheduling, which gives more robust reception of the data payload.

For the new DCI format design for URLLC PDSCH scheduling, it has been agreed to introduce a new reference point for the time domain resource allocation of PDSCH.

For time domain resource allocation indication for PDSCH for Rel-16 URLLC in new DCI format, using the starting symbol of the PDCCH monitoring occasion in which the DL assignment is detected as the reference of the SLIV is supported.

An RRC parameter is used to enable the utilization of the new reference

When the RRC parameter enables the utilization of the new reference, the new reference is applied for TDRA entries with K0=0

For Further Study (FFS): Other entries with K0>0 can also be included in the same TDRA table For other entries (if any) in the same TDRA table, the reference is slot boundary as in Rel-15.

PDSCH mapping type A is not supported with the new reference. In Rel.15, the reference point is the first symbol in the slot, while for this new DCI format, the reference point is instead the starting symbol of the PDCCH monitoring occasions, which can be different from the first symbol of the slot, especially for Type B scheduling, see Table 1.

NR Rel-16 Enhancements for PDSCH with Multi-TRPs

In NR Rel-16, there are discussions ongoing on the support of PDSCH with multi-TRP. One mechanism that is being considered in NR Rel-16 is a single PDCCH scheduling one or multiple PDSCHs from different TRPs. The single PDCCH is received from one of the TRPs. FIG. 4 shows an example where a DCI received by the UE in PDCCH from TRP1 schedules two PDSCHs. The first PDSCH (PDSCH1) is received from TRP1 and the second PDSCH (PDSCH2) is received from TRP2. Alternatively, the single PDCCH schedules a single PDSCH where PDSCH layers are grouped into two groups and where layer group 1 is received from TRP1 and layer group 2 is received from TRP2. In such cases, each PDSCH or layer group is transmitted from a different TRP has a different TCI state associated with it. In the example of FIG. 4, PDSCH1 is associated with TCI State p, and PDSCH 2 is associated with TCI state q.

In the RAN1. AdHoc meeting in January 2019, the following was agreed:

Agreement

TCI indication framework shall be enhanced in Rel-16 at least for enhanced Mobile Broadband (eMBB):

Each TCI code point in a DCI can correspond to 1 or 2 TCI states

When 2 TCI states are activated within a TCI code point, each TCI state corresponds to one CDM group, at least for DMRS type 1

FFS design for DMRS type 2

FFS: TCI field in DCI, and associated MAC-CE signaling impact

According to the above agreement, each codepoint in the DCI Transmission Configuration Indication field can be mapped to either 1 or 2 TCI states. This can be interpreted as follows:

"A DCI in PDCCH schedules 1 or 2 PDSCHs (or 1 or 2 layer groups if a single PDSCH) where each PDSCH or layer group is associated with a different TCI state; the codepoint of the Transmission Configuration Indication field in DCI indicates the 1-2 TCI states associated with the 1 or 2 PDSCHs or layer groups scheduled." In this case, the two DMRSs of the two PDSCHs or the two layer groups respectively are not mapped to the same DMRS CDM group.

It should be noted that in FR2 operation, a single PDCCH that is received by a UE using one TCI state with QCL type D (for example, a single PDCCH received using one received beam) may indicate one or more PDSCHs associated with another TCI state with QCL type D (for example, one of the PDSCHs received using another received beam). In this case, the UE needs to switch beams from the point of receiving the last symbol of the single PDCCH to the point of receiving the first symbol of the PDSCH. Such beam switching delays are counted in terms of the number of OFDM symbols. For example, at 60 kHz subcarrier spacing, the beam switching delay can be seven symbols; at 120 kHz subcarrier spacing, the beam switching delay can be fourteen symbols.

For Multi-TRP Based PDSCH Transmission, Different Schemes are being Considered in NR Rel-16.

One of the agreed upon schemes involves slot-based time multiplexing the different PDSCHs transmitted from multiple TRPs. An example is shown in FIG. 5. In this example, a PDCCH indicates two different PDSCHs where PDSCH 1 associated with TCI state p is transmitted from TRP 1, and PDSCH 2 associated with TCI state q is transmitted from TRP2. Since PDSCHs 1 and 2 are time multiplexed in different slots, the DMRS corresponding to the two PDSCHs are transmitted in non-overlapping resources (i.e., different slots). Hence, the DMRSs for the two PDSCHs can use the same CDM group or even exactly the same antenna ports in each of the slots. In the example of FIG. 5, DMRS for PDSCH 1 is transmitted using CDM group 0 in slot n, while DMRS for PDSCH 2 is transmitted using CDM group 0 in slot n+1. In NR Rel-16, the scheme of slot-based time-multiplexed PDSCHs associated with different TCI states is useful for Ultra Reliable Low Latency Communication (URLLC).

Another scheme that has been agreed involves mini-slot-based time multiplexing (also known as PDSCH Type B scheduling in NR specifications) the different PDSCHs transmitted from multiple TRPs. An example is shown in FIG. 6. In this example, a PDCCH indicates two different PDSCHs where PDSCH 1 associated with TCI state p is transmitted from TRP 1 and PDSCH 2 associated with TCI state q is transmitted from TRP2. Since PDSCHs 1 and 2 are time multiplexed in different mini-slots, the DMRS corresponding to the two PDSCHs are transmitted in non-overlapping resources (i.e., different mini-slots). Hence, the DMRSs for the two PDSCHs can use the same CDM group or even the same antenna ports in each mini-slot. In the example of FIG. 6, DMRS for PDSCH 1 is transmitted using CDM group 0 in mini-slot n, while DMRS for PDSCH 2 is transmitted using CDM group 0 in mini-slot n+1. In NR Rel-16, the scheme of mini-slot-based time-multiplexed PDSCHs associated with different TCI states is being considered for URLLC.

Note that the PDSCHs transmitted from the two TRPs in the slot-based and mini-slot based time multiplexing schemes in FIG. 5 and FIG. 6 may correspond to the same or different redundancy versions of the same TB (i.e., repetition of the TB). Hence, the UE can do soft combining of the two PDSCHs transmitted from the two TRPs (since they are based on the same set of information bits) to achieve more reliable reception. Even though the examples in FIG. 5 and FIG. 6 show two repetitions over two TRPs, the slot-based and mini-slot based time multiplexing schemes are also applicable to cases with N>2 repetitions over M>1 TRPs. Throughout this disclosure, the terms 'PDSCH transmission occasions' and 'PDSCH repetitions' mean the same.

For the single-DCI based multi-TRP URLLC scheme 3 (aka, mini-slot based repetition), the following has been agreed:

For single-DCI based M-TRP URLLC scheme 3, the starting symbol of the second transmission occasion has K symbol offset relative to the last symbol of the first transmission occasion, whereas the value of K can be optionally configured by RRC. If not configured, K=0.

The starting symbol and length of the first transmission occasion is indicated by SLIV.

The length of the second transmission occasion is the same with the first transmission occasion.

Exact candidate value of K can be decided in RAN1 #99

FFS: Any restrictions on the possible value pairs for K and SLIV

One of the reasons for introducing a configurable symbol offset K in the above agreement is to allow transmission of multi-TRP URLLC scheme 3 in a slot containing both DL and UL symbols. Particularly, the use case for having a non-zero K value is to allow the case where there are UL symbols (and flexible symbols) in between the DL symbols allocated for the first transmission occasion and the DL symbols allocated for the second transmission occasion. Considering Table 11.1.1-1 of TS 38.213, slot formats 46, 47, 49, 50, 53, and 54 offer the possibility of $1^{st}$ transmission occasion in a set of DL symbols and the $2^{nd}$ transmission occasion in another set of DL symbol wherein the two sets of DL symbols are separated by UL/flexible symbols. This is illustrated in FIG. 7.

SUMMARY

Systems and methods of signaling Time Domain Resource Allocation (TDRA) for PDSCH transmission are provided. In some embodiments, a method performed by a wireless device for determining a start symbol of a plurality of PDSCH transmission occasions within a slot using a relative reference symbol includes: receiving an indication that comprises: an indication that enables/disables the use of the relative reference symbol $S_0$ as the reference point for indicating the starting symbol; an indication from the network of at least one offset value K which is the offset between the last symbol of a first PDSCH transmission occasion and the first symbol of a second PDSCH transmission occasion; an indication from the network that there are multiple PDSCH transmission occasions; and an indication that a symbol, S, of the first transmission occasion and length, L, corresponds to all transmission occasions. The method also includes determining the symbol at which each of the plurality of PDSCH transmission occasions end which will be used to determine how many of the PDSCH transmission occasions are received by the wireless device. In this way, the wireless device behavior is defined on how many PDSCH repetitions the wireless device can receive when the use of the new relative reference for the starting symbol of the first PDSCH repetition is enabled.

Certain aspects of the present disclosure and their embodiments may provide solutions to the aforementioned or other challenges.

There are, proposed herein, various embodiments which address one or more of the issues disclosed herein. Systems and methods for signaling TDRA for PDSCH transmission are provided. In some embodiments, a method performed by a wireless device for determining a start symbol of a plurality of PDSCH transmission occasions within a slot using a relative reference symbol includes receiving an indication that comprises one or more of the group consisting of: an indication that enables/disables the use of the relative reference symbol $S_0$ as the reference point for indicating the starting symbol; an indication from the network of at least one offset value K which is the offset between the last symbol of a first PDSCH transmission occasion and the first symbol of a second PDSCH transmission occasion; an indication from the network that there are multiple PDSCH transmission occasions; and an indication that a symbol S of the first transmission occasion and length L corresponding to all transmission occasions. The method optionally includes the wireless device determining the symbol at which each of the plurality of PDSCH transmission occasions end which will be used to determine how many of the PDSCH transmission occasions are received by the wireless device.

In some embodiments, a method performed by a base station for indicating a start symbol of a plurality of PDSCH transmission occasions within a slot using a relative reference symbol includes transmitting an indication that comprises one or more of the group consisting of: an indication that enables/disables the use of the relative reference symbol $S_0$ as the reference point for indicating the starting symbol; an indication from the network of at least one offset value K which is the offset between the last symbol of a first PDSCH transmission occasion and the first symbol of a second PDSCH transmission occasion; an indication from the network that there are multiple PDSCH transmission occasions; and an indication that a symbol S of the first transmission occasion and length L corresponding to all transmission occasions.

In some embodiments, receiving the indication comprises receiving the indication via RRC signaling.

In some embodiments, receiving the indication comprises receiving the indication via a TCI field in DCI which indicates the multiple transmission occasions when there are more than one TCI state indicated by a codepoint in the TCI field.

In some embodiments, each transmission occasion is associated with one of the TCI states indicated by the codepoint in the TCI field.

In some embodiments, receiving the indication comprises receiving the indication via the TCI field in DCI which indicates the multiple transmission occasions when there is one TCI state indicated by a codepoint in the TCI field.

In some embodiments, all transmission occasions are associated with the one TCI state indicated by the codepoint in the TCI field.

In some embodiments, receiving the indication comprises receiving the indication via a TDRA field in DCI.

In some embodiments, the wireless device receives only the PDSCH transmission occasions that end on or before the slot boundary.

In some embodiments, the wireless device does not receive any of the PDSCH transmission occasions if at least one of the PDSCH transmission occasions crosses the slot boundary.

In some embodiments, the wireless device fully receives the PDSCH transmission occasions that end on or before the slot boundary, and delays the PDSCH transmission occasions that cross the slot boundary to the next slot.

In some embodiments, the wireless device fully receives the PDSCH transmission occasions that end on or before the slot boundary, and shortens the PDSCH transmission occasions that cross the slot boundary.

In some embodiments, the wireless device fully receives the PDSCH transmission occasions that end on or before the slot boundary, and fully receives the PDSCH transmission occasions that cross the slot boundary under certain conditions.

In some embodiments, the certain conditions include if the excess symbols that crosses into the next slot does not contain a monitoring occasion, a configured TRS or other periodic CSI-RS, a configured LTE CRS rate matching pattern or other reserved resources.

In some embodiments, the determining of the symbol at which each of the plurality of PDSCH transmission occasions end and the subsequent determining of how many of the PDSCH transmission occasions are received at the UE are conditioned one or both of the following: whether the use of the relative reference symbol S0 as the reference point for indicating the starting symbol is enabled or disabled; and the value of the offset K.

Certain embodiments may provide one or more of the following technical advantage(s). The proposed solution defines the UE behavior on how many PDSCH repetitions the UE can receive when the use of the new relative reference for the starting symbol of the first PDSCH repetition is enabled.

BRIEF DESCRIPTION OF THE DRAWINGS

The accompanying drawing figures incorporated in and forming a part of this specification illustrate several aspects of the disclosure, and together with the description serve to explain the principles of the disclosure.

FIGS. 27 through 30 are flowcharts illustrating methods implemented in a communication system, according to some embodiments of the present disclosure.

DETAILED DESCRIPTION

Figure 1:
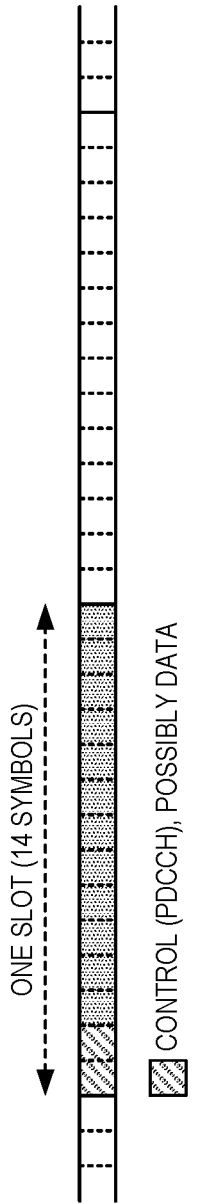
FIG. 1 illustrates a New Radio (NR) time-domain structure with 15 kHz subcarrier spacing.
Figure 2:
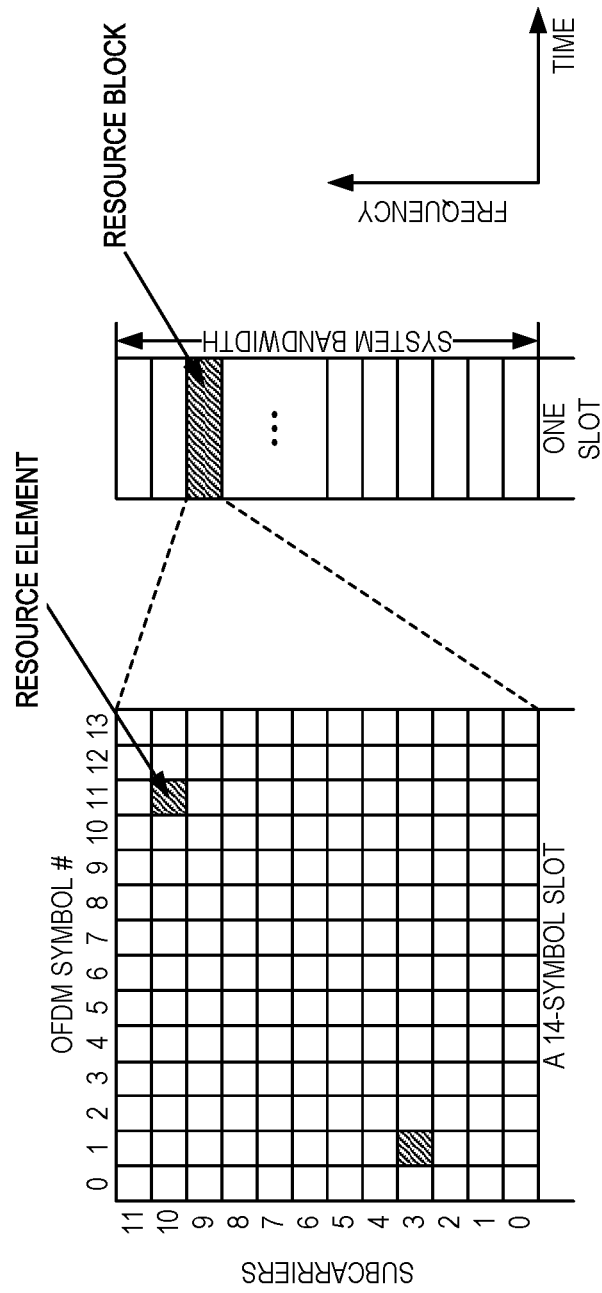
FIG. 2 illustrates a basic NR physical time-frequency resource grid where only one Resource Block (RB) within a 14-symbol slot is shown.
Figure 3:
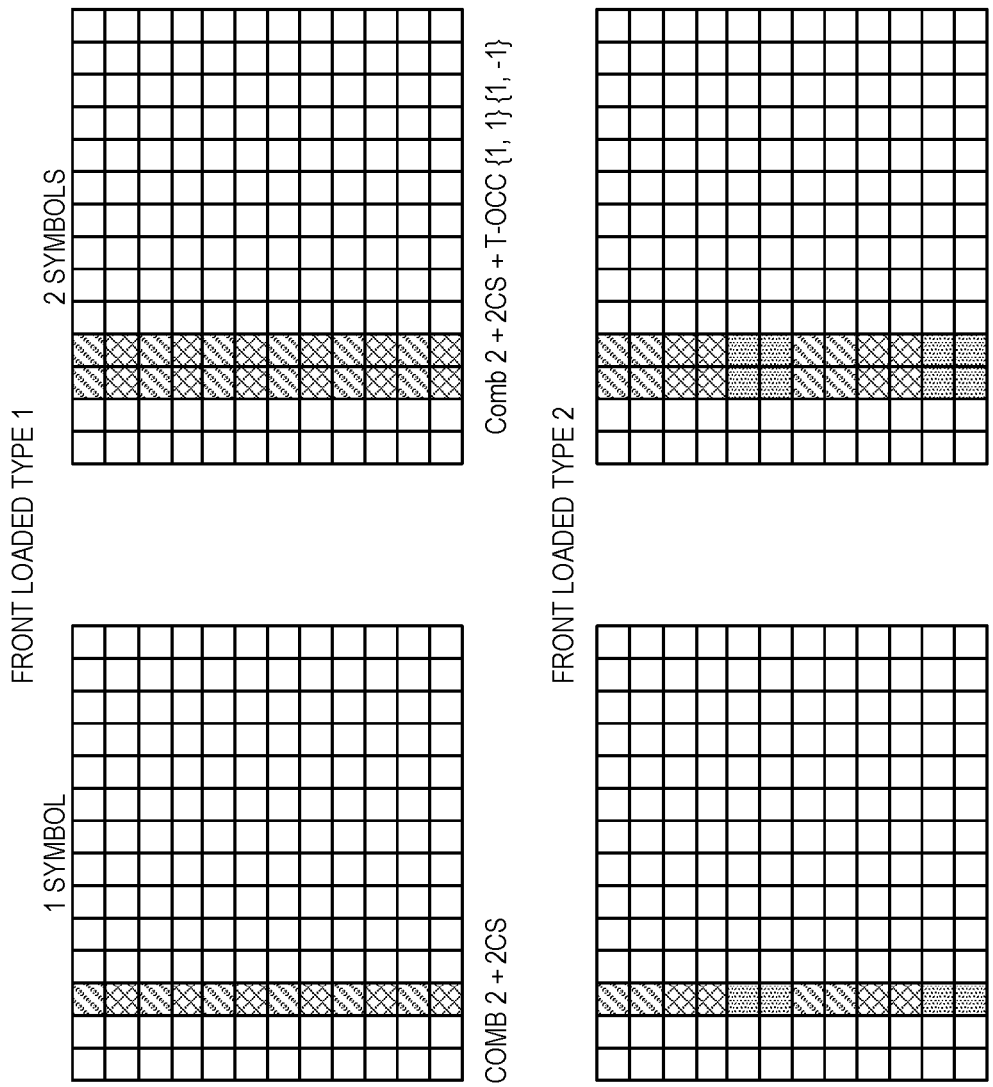
FIG. 3 shows the mapping of front-loaded Demodulation Reference Signals (DMRS) for configuration Type 1 and Type 2 with single-symbol and double-symbol DMRS and for the mapping type A with first DMRS in third symbol of a transmission interval of 14 symbols.
Figure 4:
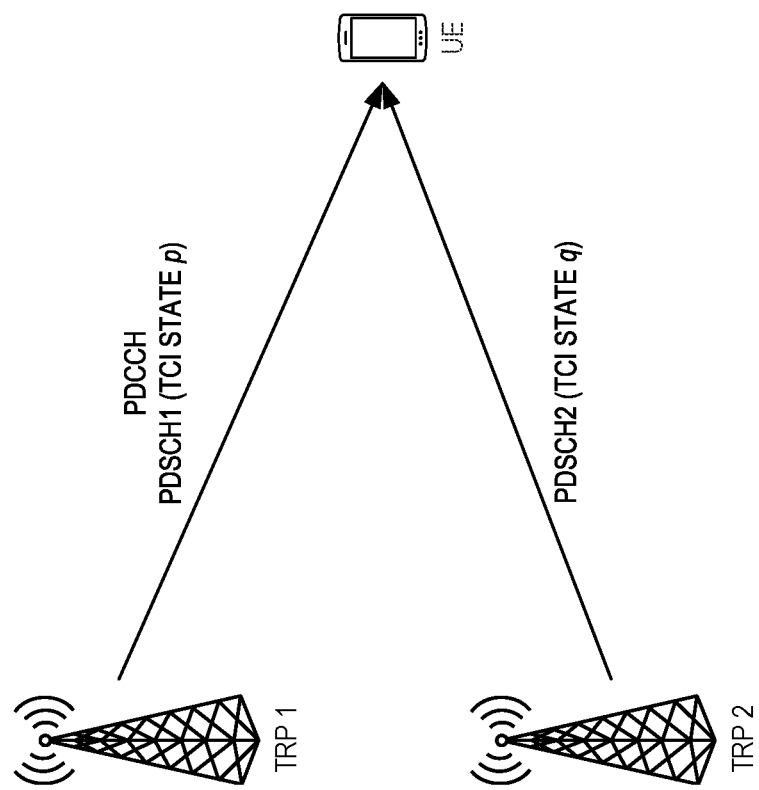
FIG. 4 shows an example where a Downlink Control Information (DCI) received by the User Equipment (UE) in a Physical Downlink Control Channel (PDCCH) from TRP1 schedules two PDSCHs.
Figure 5:
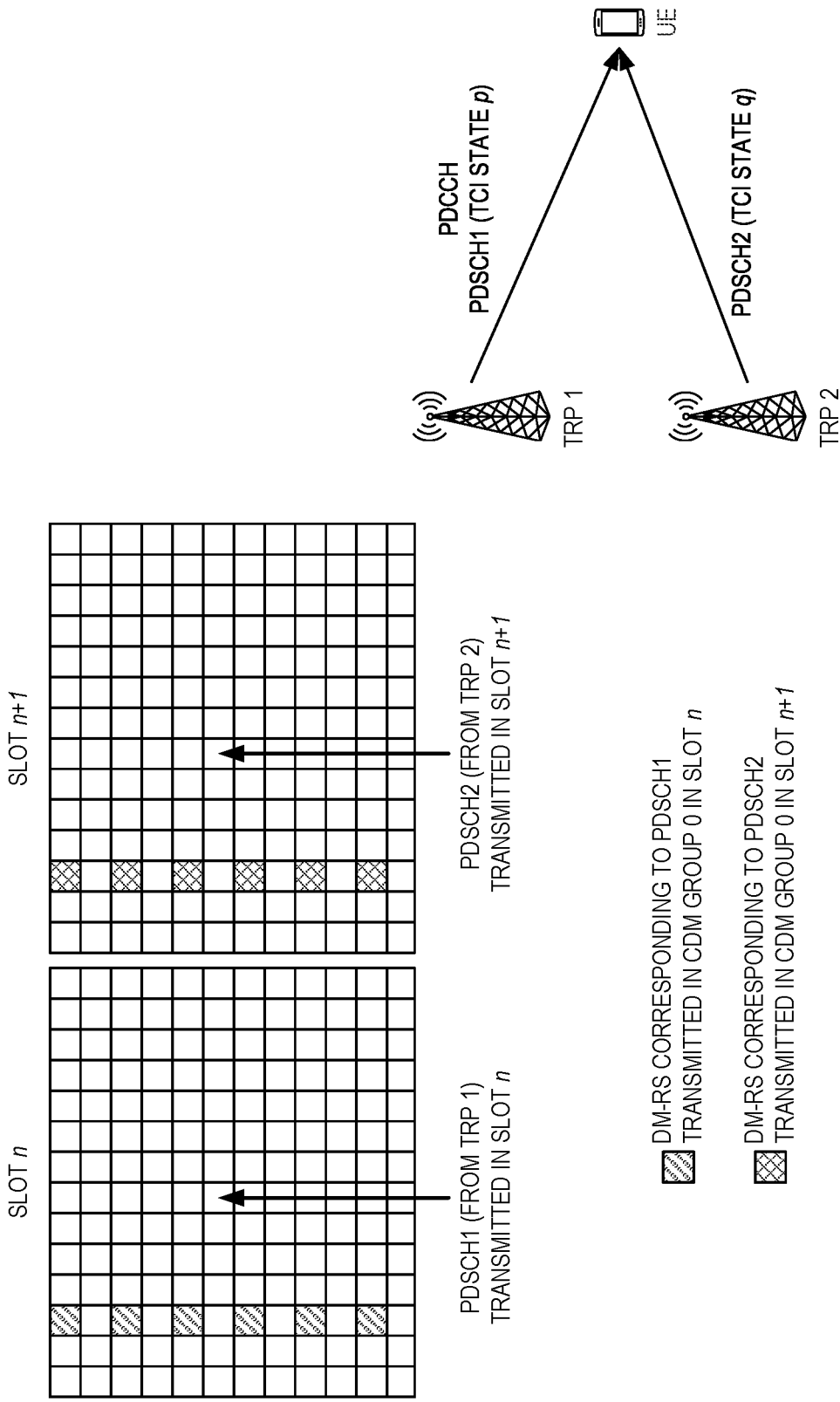
FIG. 5 illustrates slot-based time multiplexing different PDSCHs transmitted from multiple TRPs.
Figure 6:
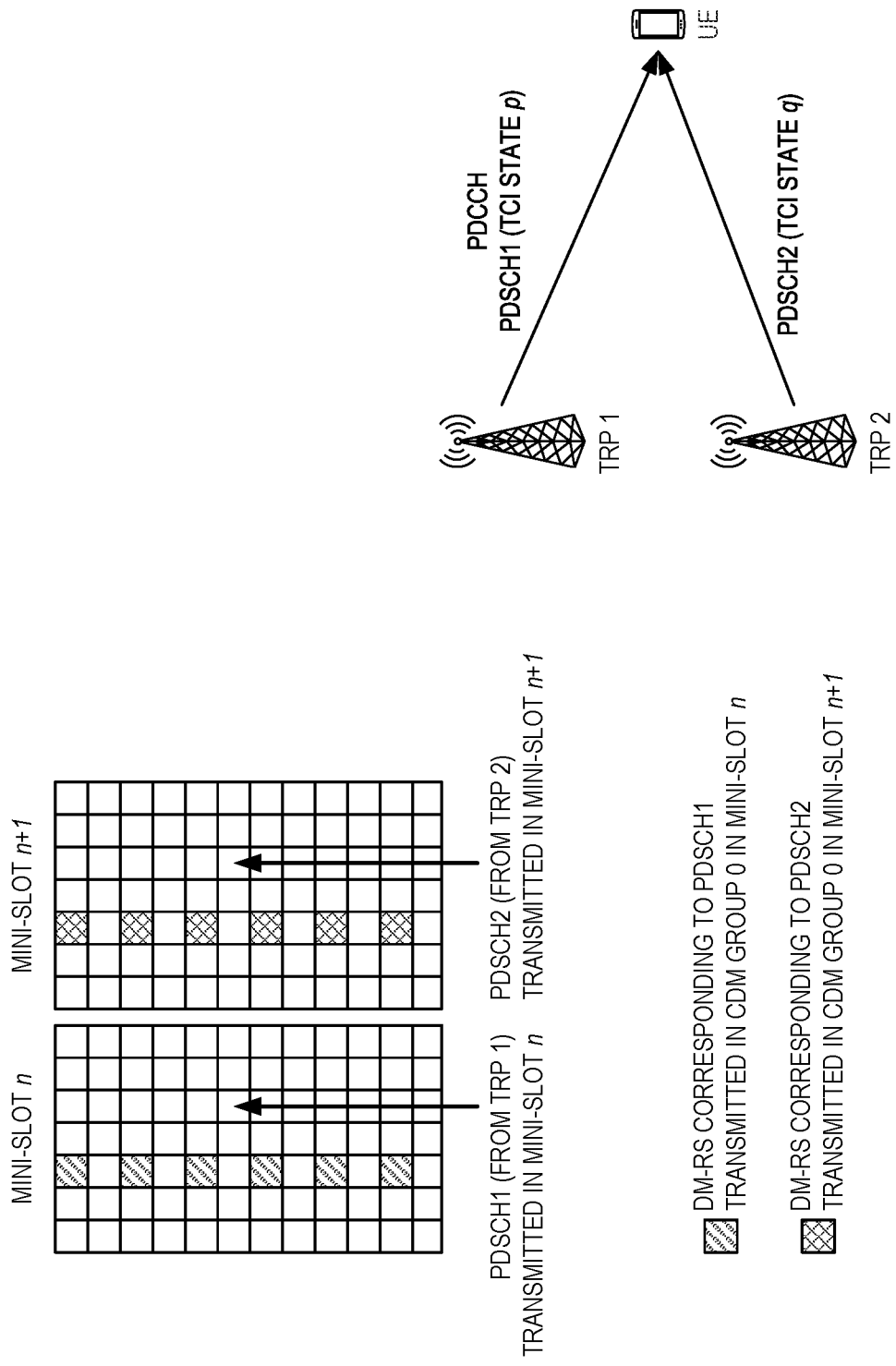
FIG. 6 illustrates mini-slot-based time multiplexing (also known as PDSCH Type B scheduling in NR specifications) the different PDSCHs transmitted from multiple TRPs.
Figure 7:
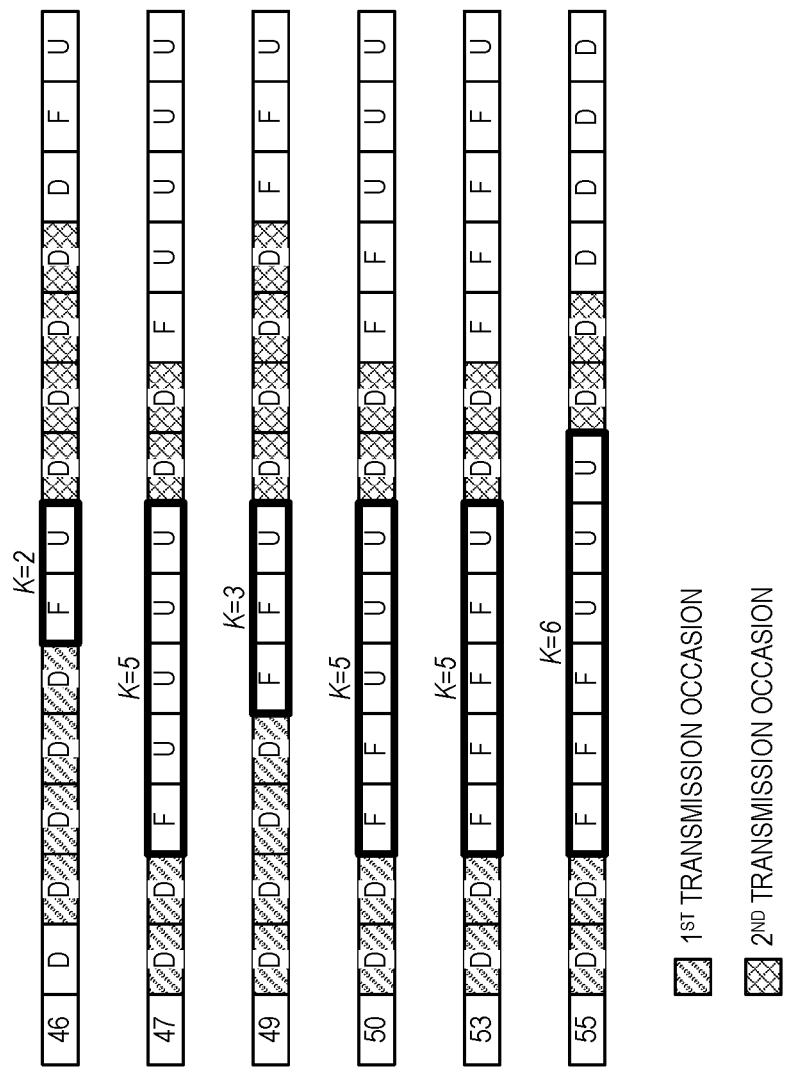
FIG. 7 illustrates the possibility of $1^{st}$ transmission occasion in a set of DL symbols and the $2^{nd}$ transmission occasion in another set of DL symbol wherein the two sets of DL symbols are separated by UL/flexible symbols.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing a Access and Mobility Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

Figure 8:
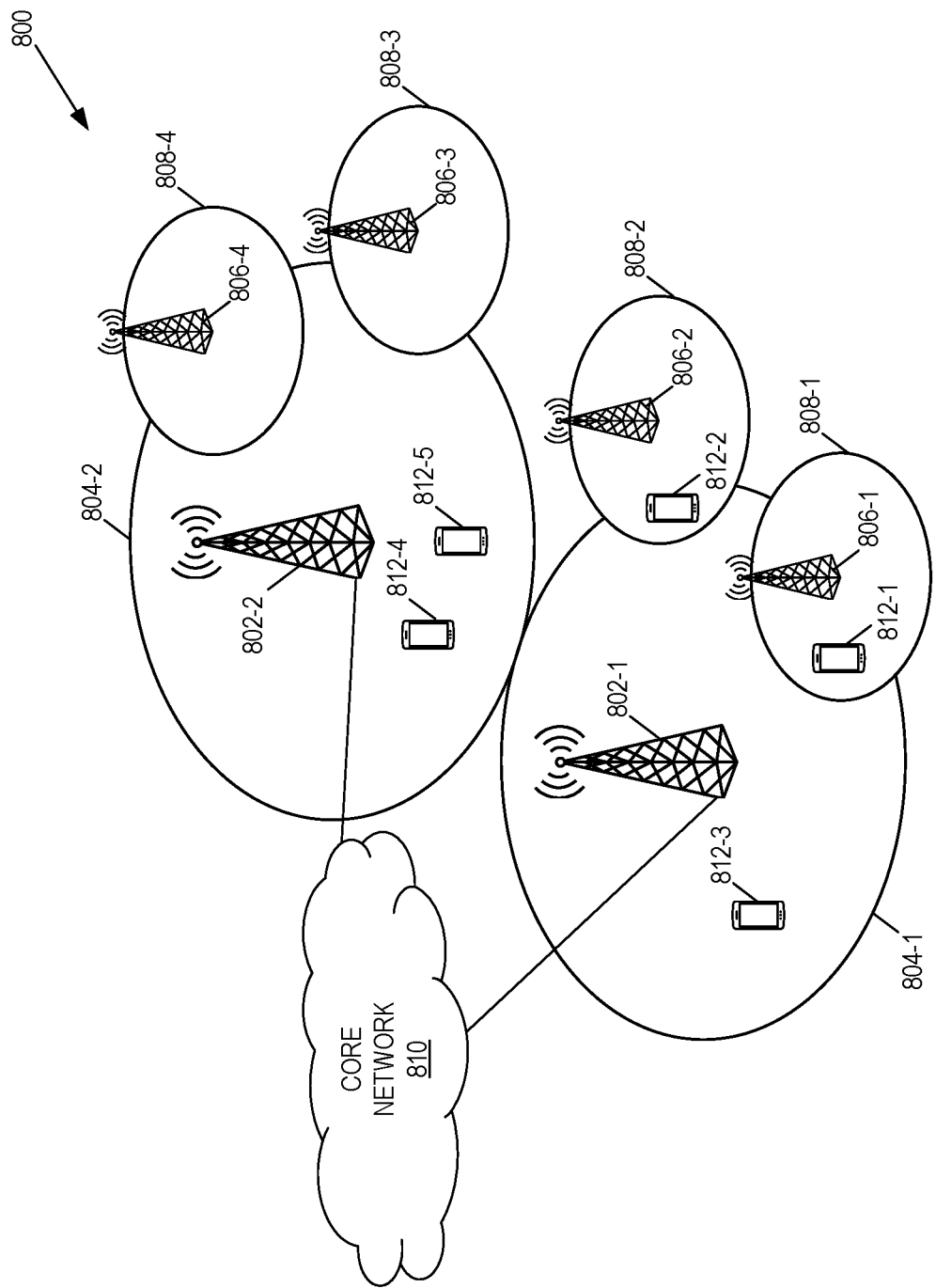
FIG. 8 illustrates one example of a cellular communications system in which embodiments of the present disclosure may be implemented.

FIG. 8 illustrates one example of a cellular communications system 800 in which embodiments of the present disclosure may be implemented. In the embodiments described herein, the cellular communications system 800 is a 5G system (5GS) including a NR Radio Access Network (RAN) or LTE RAN (i.e., Evolved Universal Terrestrial Radio Access (E-UTRA) RAN) or an Evolved Packet System (EPS) including a LTE RAN. In this example, the RAN includes base stations 802-1 and 802-2, which in LTE are referred to as eNBs (when connected to an Evolved Packet Core (EPC) and in 5G NR are referred to as gNBs (e.g., LTE RAN nodes connected to 5GC, which are referred to as gn-eNBs), controlling corresponding (macro) cells 804-1 and 804-2. The base stations 802-1 and 802-2 are generally referred to herein collectively as base stations 802 and individually as base station 802. Likewise, the (macro) cells 804-1 and 804-2 are generally referred to herein collectively as (macro) cells 804 and individually as (macro) cell 804. The RAN may also include a number of low power nodes 806-1 through 806-4 controlling corresponding small cells 808-1 through 808-4. The low power nodes 806-1 through 806-4 can be small base stations (such as pico or femto base stations) or Remote Radio Heads (RRHs), or the like. Notably, while not illustrated, one or more of the small cells 808-1 through 808-4 may alternatively be provided by the base stations 802. The low power nodes 806-1 through 806-4 are generally referred to herein collectively as low power nodes 806 and individually as low power node 806. Likewise, the small cells 808-1 through 808-4 are generally referred to herein collectively as small cells 808 and individually as small cell 808. The cellular communications system 800 also includes a core network 810, which in the 5GS is referred to as the 5G core (5GC). The base stations 802 (and optionally the low power nodes 806) are connected to the core network 810.

The base stations 802 and the low power nodes 806 provide service to wireless communication devices 812-1 through 812-5 in the corresponding cells 804 and 808. The wireless communication devices 812-1 through 812-5 are generally referred to herein collectively as wireless communication devices 812 and individually as wireless communication device 812. In the following description, the wireless communication devices 812 are oftentimes UEs, but the present disclosure is not limited thereto.

There currently exist certain challenges. Existing Time Domain Resource Allocation (TDRA) of DCI for multi-TRP does not consider that the reference for PDSCH may not be a slot boundary, which is a problem since UE behavior is not defined when this occurs. Existing TDRA does not consider the new reference of PDSCH SLIV for DL-SPS PDSCH. Existing TDRA does not consider the back-to-back repetition of PDSCH of single-TRP.

Systems and methods of signaling TDRA for PDSCH transmission are provided. In some embodiments, a method performed by a wireless device for determining a start symbol of a plurality of PDSCH transmission occasions within a slot using a relative reference symbol includes: receiving an indication that comprises: an indication that enables/disables the use of the relative reference symbol $S_0$ as the reference point for indicating the starting symbol; an indication from the network of at least one offset value K, which is the offset between the last symbol of a first PDSCH transmission occasion and the first symbol of a second PDSCH transmission occasion; an indication from the network that there are multiple PDSCH transmission occasions; and an indication that a symbol, S, of the first transmission occasion and length, L, corresponding to all transmission occasions. The method also includes determining the symbol at which each of the plurality of PDSCH transmission occasions end which will be used to determine how many of the PDSCH transmission occasions are received by the wireless device. In this way, the wireless device behavior is defined on how many PDSCH repetitions the wireless device can receive when the use of the new relative reference for the starting symbol of the first PDSCH repetition is enabled.

Figure 9:
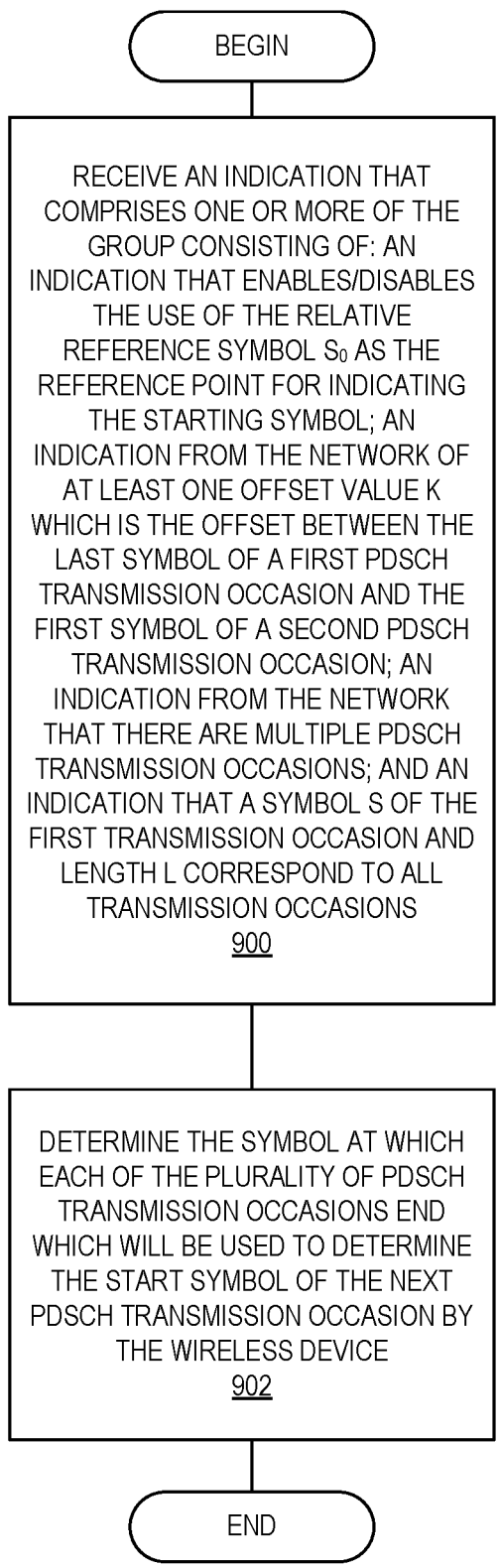
FIGS. 9 and 10 illustrate some embodiments of the current disclosure.
Figure 10:
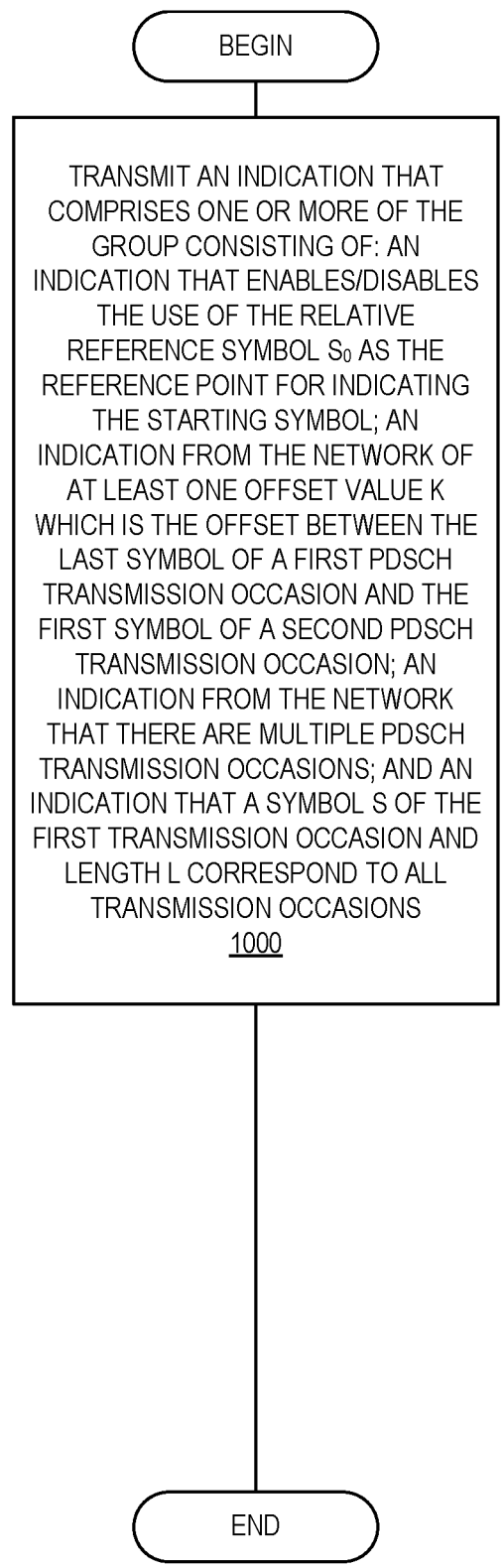

FIGS. 9 and 10 illustrate some embodiments of the current disclosure. Systems and methods for signaling TDRA for PDSCH transmission are provided. In some embodiments, a method performed by a wireless device for determining a start symbol of a plurality of PDSCH transmission occasions within a slot using a relative reference symbol includes receiving an indication that comprises one or more of the group consisting of: an indication that enables/disables the use of the relative reference symbol $S_0$ as the reference point for indicating the starting symbol; an indication from the network of at least one offset value K which is the offset between the last symbol of a first PDSCH transmission occasion and the first symbol of a second PDSCH transmission occasion; an indication from the network that there are multiple PDSCH transmission occasions; and an indication that a symbol S of the first transmission occasion and length L correspond to all transmission occasions (step 900). The method optionally includes the wireless device determining the symbol at which each of the plurality of PDSCH transmission occasions end which will be used to determine the start symbol of the next PDSCH transmission occasion by the wireless device (step 902).

In some embodiments, a method performed by a base station for indicating a start symbol of a plurality of PDSCH transmission occasions within a slot using a relative reference symbol includes transmitting an indication that comprises one or more of the group consisting of: an indication that enables/disables the use of the relative reference symbol $S_0$ as the reference point for indicating the starting symbol; an indication from the network of at least one offset value K which is the offset between the last symbol of a first PDSCH transmission occasion and the first symbol of a second PDSCH transmission occasion; an indication from the network that there are multiple PDSCH transmission occasions; and an indication that a symbol S of the first transmission occasion and length L correspond to all transmission occasions (step 1000).

In some embodiments, this might result in the behavior of the wireless device being defined on how many PDSCH repetitions the wireless device can receive when the use of the new relative reference for the starting symbol of the first PDSCH repetition is enabled.

TDRA with Relative Reference for Single-DCI Multi-TRP

In this embodiment, the PDSCH TDRA using relative reference is applied to single-DCI multi-TRP transmission. The relative reference is $S_0$ in symbols, $S_0 \geq 0$, wherein $S_0$ is the starting symbol of the PDCCH monitoring occasion in which the single-DCI scheduling multi-TRP transmission is detected. This is in contrast to the Rel-15 fixed reference of $S_0=0$ (i.e., slot boundary is used as TDRA reference).

When the multi-TRP uses M repetitions within a slot, and each of the adjacent repetitions are separated by K ($K \geq 0$) symbols, then the PDSCH transmission starts at symbol $(S_0+S)$, and ends at symbol $(S_0+S+(M-1)*K+M*L)$, where S is the signaled start symbol relative to symbol $S_0$, and L is the duration of one PDSCH repetition. Here, it is assumed that all the M PDSCH repetitions have the same duration L. If the PDSCH repetitions do not have the same duration, the formula can be easily revised to reflect that.

The M repetitions are transmitted from T transmission points or T different beams from the same transmission point or a combination of different beams and transmission points, and typically $M \geq T$, hence one transmission point or beam is utilized in more than one repetition. Note that $T=1$ is a valid special case.

The T transmission points or beams are in specifications described as different QCL source RS information, hence each transmission point and/or beam is in specifications is identified via their TCI state, respectively.

For example, in multi-TRP for URLLC using mini-slots (Type B scheduling), $M=T=\{1 \text{ or } 2\}$.

Figure 11:
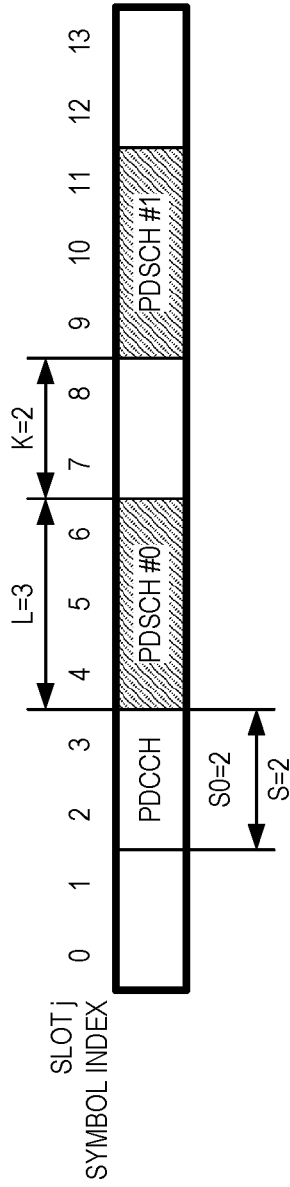
FIG. 11 illustrates a PDSCH with two repetitions in a slot where the TDRA is signaled relative to the reference $S_0$ which is the PDCCH that carries the scheduling assignment for the PDSCH reception, according to some embodiments of the present disclosure.

One example is illustrated in FIG. 11 where the offset K=2 has been configured by higher layers and where length three PDSCH scheduling is used (as supported in NR Rel.16). FIG. 11 illustrates PDSCH with two repetitions in a slot where the TDRA is signaled relative to the reference $S_0$ which is the PDCCH that carries the scheduling assignment for the PDSCH reception.

TDRA with Relative Reference for PDSCH with Mini-Slot Repetition

When only using a single TRP/single beam (hence a single TCI state, T=1), the PDSCH can be transmitted repeatedly in a slot. In terms of TDRA, the time domain resource is similar to that of multi-TRP (for example, FIG. 11), except that all M repetitions are associated with a single TRP/beam/QCL source.

Furthermore, the relative reference for PDSCH TDRA can be applied as well, i.e., $S_0 >= 0$.

TDRA with Relative Reference for DL-SPS PDSCH

In this embodiment, the PDSCH TDRA using the relative reference is applied to DL SPS. That is, in the DCI that activates the DL SPS configuration, the DCI uses a TDRA with relative reference $S_0 >= 0$.

Figure 12:
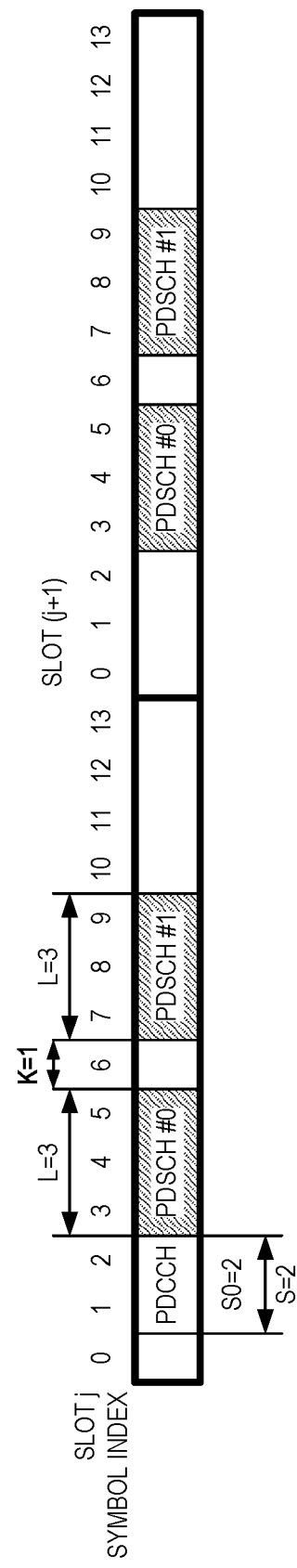
FIG. 12 illustrates the DL SPS PDSCH configured with two repetitions, where the TDRA is signaled with a relative reference $S_0$ in the activation DCI, according to some embodiments of the present disclosure.

This is illustrated with an example in FIG. 12. The DL SPS PDSCH is configured with two repetitions, where the TDRA is signaled with a relative reference $S_0$ in the activation DCI. The activation DCI is carried in PDCCH of slot j. This example assumes a SPS periodicity of 1 slot. Hence, in the subsequent period (e.g., slot (j+1) in this example), the PDSCH is repeated according to the time domain resources as activated.

For the DL SPS transmission, either single-TRP or multi-TRP can be used to transmit the PDSCH.

Moreover, the M repetitions in each slot may be associated with T>1 different TCI states. For example, the first repetition in slot j is associated with the first TCI state in the TCI code point while the second repetition in slot j is associated with the second TCI state in the TCI code point. In slots >j, the same association between repetition instance and TCI state is used as in slot j.

Error Case Handling

When allowing the repetition of the PDSCHs within a slot, error case may arise. In the following, a slot boundary is used as an example that may cause skipping, splitting, or delaying of a PDSCH repetition.

Figure 13:
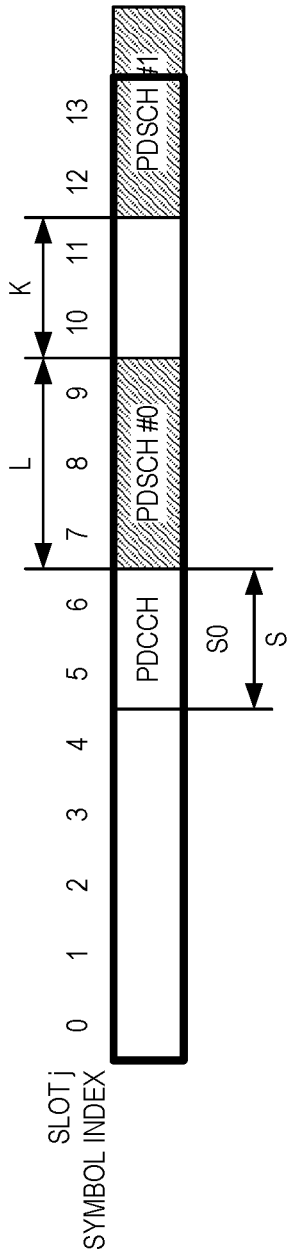
FIGS. 13 to 17 illustrate PDSCH with two repetitions where the TDRA is signaled with a relative reference $S_0$, according to some embodiments of the present disclosure.

As discussed, a PDSCH transmission might cross the slot boundary if not adjusted. For the case of M repetitions, this occurs when $S_0+S+(M-1)*K+M*L>14$ if the M repetitions are intended to be contained within a slot. If the M repetitions are allowed to cross over to the next slot, care should be taken to ensure that a PDSCH repetition does not straddle the slot boundary. One example is illustrated in FIG. 13 where there is one excess symbol that maps to an OFDM symbol in the following slot. FIG. 13 illustrates a PDSCH with two repetitions where the TDRA is signaled with a relative reference $S_0$, and the PDSCH repetition #1 crosses the slot boundary (error to be handled). Such error case can be handled in several ways.

Figure 14:
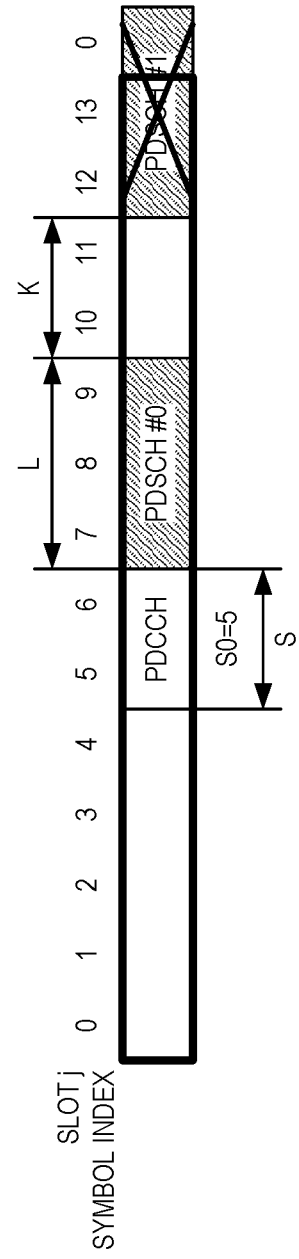

In one example, the PDSCH repetition that crosses the slot boundary is considered invalid and assumed to be dropped by the gNB. Correspondingly, the UE does not perform reception of the invalid repetition. This is illustrated in with an example FIG. 14. FIG. 14 illustrates a PDSCH with two repetitions where the TDRA is signaled with a relative reference $S_0$. The PDSCH repetition #1 is dropped, which would otherwise cross the slot boundary.

Figure 15:
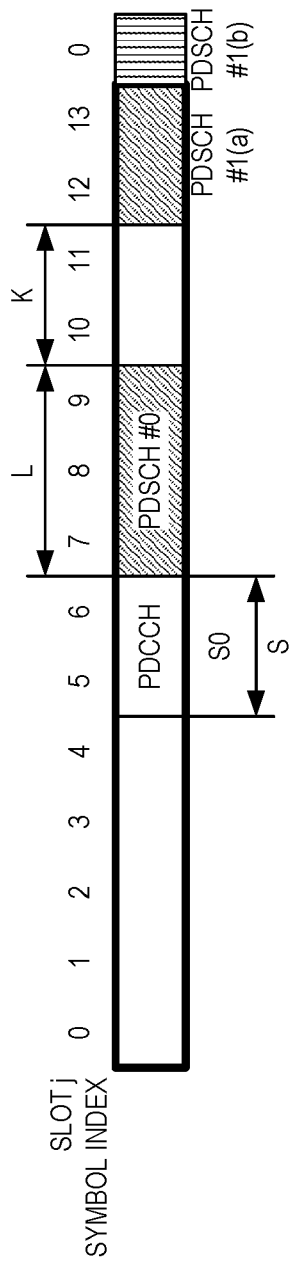

In another example, the PDSCH repetition that crosses the slot boundary is further split into two sub-repetitions, one before the slot boundary, the other after the slot boundary where the PDSCH repetition after the slot boundary uses the same number of symbols as the number of excess symbols. FIG. 15 illustrates a PDSCH with two repetitions where the TDRA is signaled with a relative reference $S_0$. The PDSCH repetition #1 is further split into two sub-repetitions (PDSCH #1(a), PDSCH #1(b)) of the same TB, to avoid that the PDSCH crosses the slot boundary.

Figure 16:
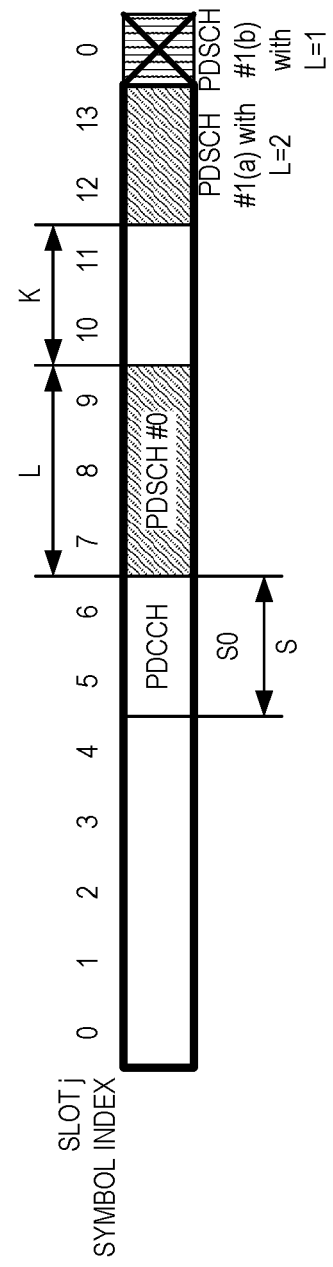

In one version of this example, a sub-repetition is further considered invalid if the length of the sub-repetition is smaller than a certain threshold. FIG. 16 illustrates a PDSCH with two repetitions where the TDRA is signaled with a relative reference $S_0$. The PDSCH repetition #1 is further split into two sub-repetitions (PDSCH #1(a) with length 2, PDSCH #1(b) with length 1) of the same TB, to avoid that the PDSCH crosses the slot boundary. The length of the PDSCH #1(b) after the split is shorter than a threshold so it is considered invalid.

Figure 17:
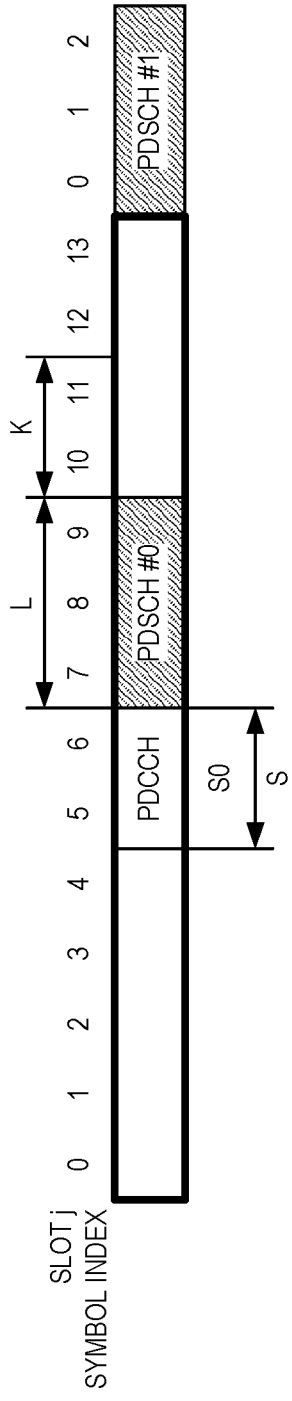

In another example, the PDSCH repetition that crosses the slot boundary is delayed to the next slot. FIG. 17 illustrates PDSCH with two repetitions where the TDRA is signaled with a relative reference $S_0$. The PDSCH repetition #1 is delayed to the first available location in next slot, to avoid that the PDSCH crosses the slot boundary.

Figure 18:
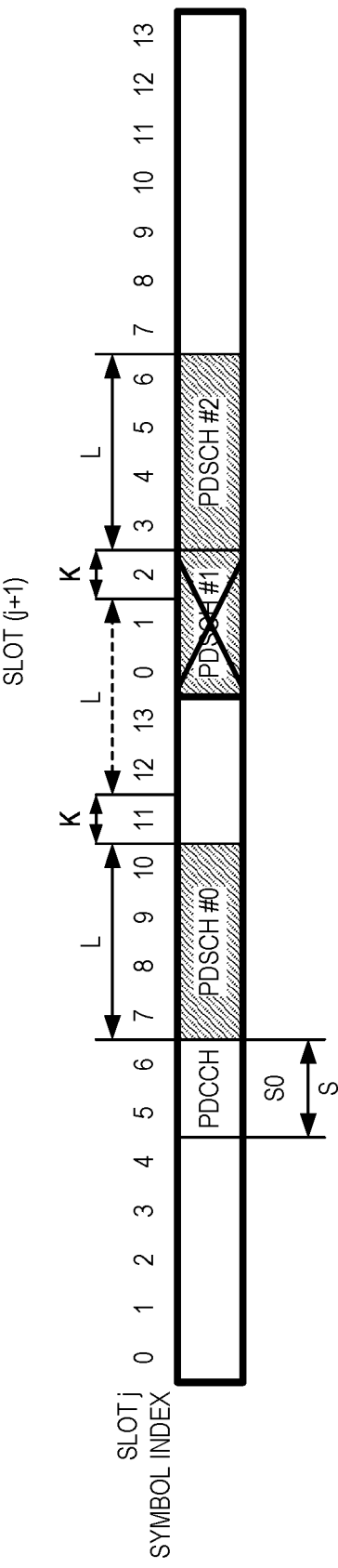
FIG. 18 illustrates PDSCH with three repetitions where the TDRA is signaled with a relative reference $S_0$, according to some embodiments of the present disclosure.

In one version of this example, the subsequent repetition following the delayed repetition, if any, starts with symbol offset relative to the end of the original allocation of the previous repetition before being delayed. If the delayed repetition overlaps in time with the subsequent repetition, the delayed repetition is considered invalid. FIG. 18 illustrates a PDSCH with three repetitions where the TDRA is signaled with a relative reference $S_0$. The PDSCH repetition #1 is delayed to the first available location in next slot, to avoid that the PDSCH crosses the slot boundary. However, its delayed allocation ends up overlapping with the allocation of the subsequent repetition (PDSCH #2). In this case, PDSCH #1 is consider invalid.

In another version of this example, the subsequent repetition following the delayed repetition, if any, starts with an offset of K symbols relative to the end of the delayed repetition.

Figure 19:
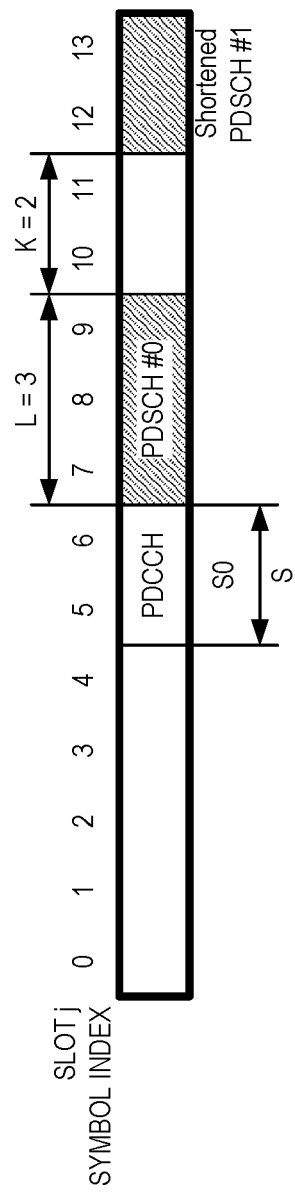
FIG. 19 illustrates PDSCH with two repetitions where the TDRA is signaled with a relative reference $S_0$, according to some embodiments of the present disclosure.

In another example, the PDSCH repetition that crosses the slot boundary is shortened to avoid crossing the slot boundary. FIG. 19 illustrates a PDSCH with two repetitions where the TDRA is signaled with a relative reference $S_0$. The PDSCH repetition #1 is shortened to avoid that the PDSCH crosses the slot boundary.

In one version of this example, a shortened repetition is considered invalid if its length after shortening is smaller than a certain threshold.

In another example, the UE is not expected to receive a scheduling where any of the M repetitions cross the slot boundary. Alternatively, the UE can ignore a scheduling DCI where any of the M repetitions cross the slot boundary.

In one particular version of this embodiment, different restrictions for multi-TRP URLLC scheme 3 is defined depending on whether the use of a relative reference for PDSCH TDRA is enabled or disabled via higher layer signaling. If the use of the relative reference for PDSCH TDRA is disabled (i.e., the slot boundary is used as the TDRA reference and $S_0=0$), then the UE expects that the multi-TRP URLLC scheme 3 transmission complies with the restriction $(S+(M-1)*K+M*L) \leq 14$ (alternatively states as $M*L \leq 14-S-(M-1)*K$). This restriction ensures that the UE expects that all the repetitions within a slot finish before the slot boundary. If the use of the relative reference for PDSCH TDRA is enabled, then the UE expects that the multi-TRP URLLC scheme 3 transmission complies with the restriction $(S_0+S+(M-1)*K+M*L) \leq 14$ (alternatively states as $M*L \leq 14-S-S_0+-(M-1)*K$). This restriction ensures that the UE expects that all the repetitions within a slot finish before the slot boundary.

In yet another example, there are rules defined where crossing the slot boundary creating excess symbols is allowed under certain conditions. If such a condition is fulfilled, the UE may receive the PDSCH even if there are excess symbols. For example, the condition can be defined to be fulfilled in case the excess symbols (and scheduled Resource Block) do not contain any of the following: a monitoring occasion, a configured TRS or other periodic CSI-RS, a configured LTE CRS rate matching pattern, or other reserved resources.

In addition to slot boundary, other issues may also prevent a PDSCH repetition to proceed as is, hence causing alteration of the PDSCH transmission. It is understood that the methods disclosed above, although described using a slot boundary an example, also adapt easily to cover other issues, or a combination of issues (e.g., slot boundary as well as Time Division Duplexing (TDD) UL symbols), that similarly prevent a PDSCH repetition to proceed as is.

One typical example is the unavailable symbols in a TDD system, including the uplink symbols (or uplink slots), symbols used for uplink-to-downlink transition, symbols used for downlink-to-uplink transition. The information of the symbols unavailable for downlink transmission is semi-statically configured according to certain slot configuration or dynamically indicated via Slot Format Indication. When encountering symbol(s) unavailable for downlink transmission, a PDSCH repetition may be skipped (i.e., dropped) partially or fully, or delayed, or split into smaller sub-repetitions (e.g., a sub-repetition before the unavailable symbols, a sub-repetition after the unavailable symbols).

Another typical example is the symbols reserved for other purposes than PDSCH transmission. The symbols may be part of reserved resources, for example, for LTE transmission in a LTE-NR coexistence case. The symbols may be allocated for reference symbol (e.g., CSI-RS, DMRS, TRS, Positioning Reference Signal, etc.) and cannot be occupied by PDSCH. The symbols may be reserved for broadcast messages (Master Information Block or System Information Block), or for MBMS transmission, and not available for PDSCH transmission for individual UE(s). When encountering symbol(s) unavailable for PDSCH transmission, a PDSCH repetition may be skipped (i.e., dropped) partially or fully, or delayed, or split into smaller sub-repetitions (e.g., a sub-repetition before the unavailable symbols, a sub-repetition after the unavailable symbols).

Specifically, the PDSCH repetition that overlaps with unavailable symbols is:
  considered invalid and assumed to be dropped by the gNB. Correspondingly, the UE does not perform reception of the invalid repetition, or
  shortened or split into sub-repetitions around the unavailable symbols, or
  delayed to start in the next available DL symbols.

In a further embodiment, when a scheduling assignment is received so that a repetition crosses the slot boundary as in FIG. 13, then the higher layer configured parameter K is overridden by a temporary parameter K'<K and K' is used as the offset instead, so that the second repetitions does not cross the slot boundary. In one example, K'=0 by default when a slot boundary crossing happens. In another example, K' is reduced to the largest K value so that the repetition does not cross the slot boundary, e.g.:

$$K'=\operatorname{argmin}_{K}(|S_0+S+(M-1)K+ML-14|)$$

If K'=0 still implies that the repetition crosses the slot boundary, then any of the methods to remedy slot boundary issue as illustrated by FIG. 14 to FIG. 19 can be applied (with K replaced by K').

In a further embodiment, each repetition in the schemes above is associated with one of T TCI states to allow multi-TRP transmission of each repetition (for the case T>1).

Applicable Condition for the Resource Allocation

Using a monitoring occasion as a start reference for TDRA allocation or enabling repetition for PDSCHs can be further conditioned with following associations:

RNTI dependency: It may be applicable only for UE specific RNTIs, i.e., Cell-RNTI (C-RNTI) and Modulation and Coding Scheme C-RNTI (MCS-C-RNTI), Circuit Switched RNTI (CS-RNTI). It cannot be applied for sending paging information using P-RNTI or system information messages using SI-RNTI.

Searchspace: It may be applicable only for certain search spaces, but not other search spaces. For example, it's applicable for UE specific search space. It cannot be applied for DCI detected in common search space.

DCI format: It may be applicable only for certain DCI formats but not for other DCI formats. For example, it is applicable for DCI 1_2 (the new DCI format in rel-16), DCI format 1_1. It cannot be applied for DCI 1_0.

Coreset: It may be applicable only for ControlResourceSet associated with certain controlResourceSetId. It may be applicable only for certain coreset configuration for supporting DCI 1_2 or coreset associated with fast processing time chain. It cannot be applied for coreset #0(ControlResourceSetZero).

Numerology: It may be applicable only for certain numerologies, but not other numerologies. For example, it is applicable for low numerologies with SCS=15 kHz, 30 kHz or 60 kHz, but not for SCS=120 kHz.

Other Considerations

As can be observed in the above discussion, some methods for handling a PDSCH repetition crossing a slot boundary become ways to support PDSCH repetition across multiple slots. Indeed, to those skilled in the art, the above methods can be easily extended to define PDSCH repetition across multiple slots. Hence the methods are generic and can be used to support multiple PDSCH transmissions across multiple slots, with or without spaces between the adjacent repetitions.

Furthermore, the above discussion used PDSCH transmission as an example, where the gNB (i.e., base station) is the transmitter and the UE (i.e., wireless device) is the receiver. The same methodology can be applied to other wireless links. In one example, the methods are applied to the sidelink, where the transmitter is one wireless device, and the receiver is another wireless device. In another example, the methods are applied to NR-U (i.e., NR over unlicensed spectrum), where the transmitter is a wireless access point, and the receiver is a wireless device.

In some embodiments a more general term "network node" is used and it can correspond to any type of radio network node or any network node, which communicates with a UE and/or with another network node. Examples of network nodes are NodeB, MgNB, SgNB, a network node belonging to MCG or SCG, base station (BS), Multi-Standard Radio (MSR) radio node such as MSR BS, gNB network controller, radio network controller, base station controller, relay, D2D UE to network relay, donor node controlling relay, base transceiver station, access point (AP), transmission points, transmission nodes, Remote Radio Unit, Remote Radio Head, nodes in distributed antenna system, core network node (e.g., Mobile Switching Center, Mobility Management Entity etc.), Operation & Maintenance, Operation Support System, Self-Organizing Network, positioning node (e.g., E-SMLC), Minimization and Drive Tests etc.

In some embodiments the non-limiting terms UE or a wireless device are used interchangeably. The UE herein can be any type of wireless device capable of communicating with a network node or another UE over radio signals. The UE may also be a radio communication device, target device, device to device (D2D) UE, machine type UE or UE capable of machine to machine communication (M2M), low-cost and/or low-complexity UE, a sensor equipped with UE, Tablet, mobile terminals, smart phone, laptop embedded equipped, laptop mounted equipment, USB dongles, Customer Premises Equipment, an Internet of Things (IoT) device, or a Narrowband IoT (NB-IoT) device etc.

Figure 20:
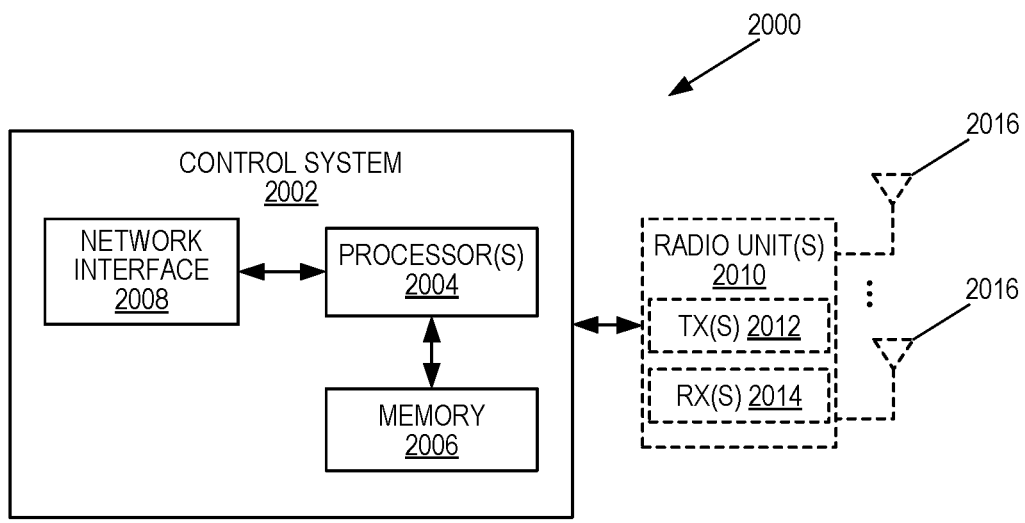
FIG. 20 is a schematic block diagram of a network node according to some embodiments of the present disclosure.

FIG. 20 is a schematic block diagram of a radio access node 2000 according to some embodiments of the present disclosure. Optional features are represented by dashed boxes. The radio access node 2000 may be, for example, a base station 802 or 806 or a network node that implements all or part of the functionality of the base station 802 or gNB described herein. As illustrated, the radio access node 2000 includes a control system 2002 that includes one or more processors 2004 (e.g., Central Processing Units (CPUs), Application Specific Integrated Circuits (ASICs), Field Programmable Gate Arrays (FPGAs), and/or the like), memory 2006, and a network interface 2008. The one or more processors 2004 are also referred to herein as processing circuitry. In addition, the radio access node 2000 may include one or more radio units 2010 that each includes one or more transmitters 2012 and one or more receivers 2014 coupled to one or more antennas 2016. The radio units 2010 may be referred to or be part of radio interface circuitry. In some embodiments, the radio unit(s) 2010 is external to the control system 2002 and connected to the control system 2002 via, e.g., a wired connection (e.g., an optical cable). However, in some other embodiments, the radio unit(s) 2010 and potentially the antenna(s) 2016 are integrated together with the control system 2002. The one or more processors 2004 operate to provide one or more functions of a radio access node 2000 as described herein. In some embodiments, the function(s) are implemented in software that is stored, e.g., in the memory 2006 and executed by the one or more processors 2004.

Figure 21:
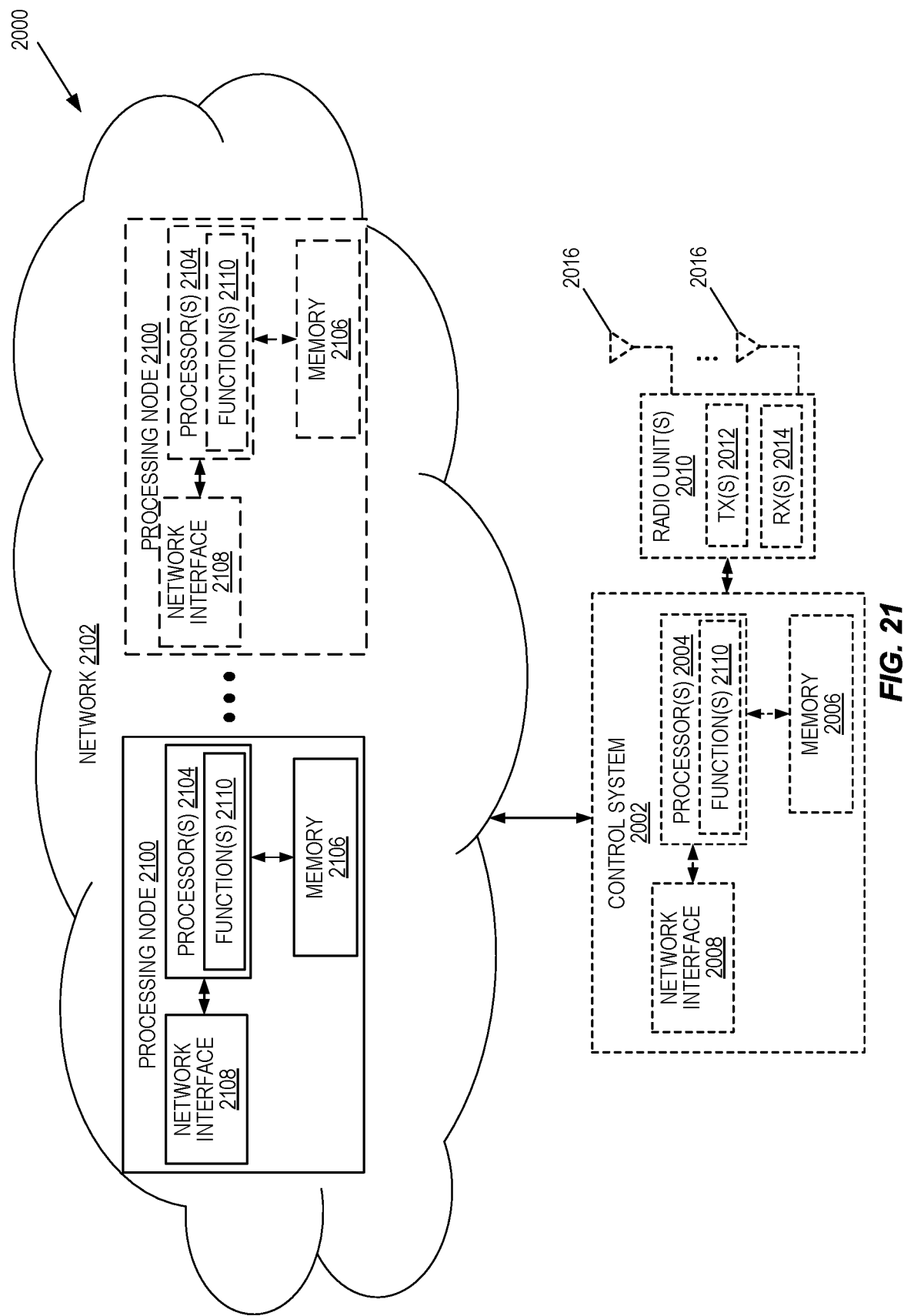
FIG. 21 is a schematic block diagram that illustrates a virtualized embodiment of the radio access node, according to some embodiments of the present disclosure.

FIG. 21 is a schematic block diagram that illustrates a virtualized embodiment of the radio access node 2000 according to some embodiments of the present disclosure. This discussion is equally applicable to other types of network nodes. Further, other types of network nodes may have similar virtualized architectures. Again, optional features are represented by dashed boxes.

As used herein, a "virtualized" radio access node is an implementation of the radio access node 2000 in which at least a portion of the functionality of the radio access node 2000 is implemented as a virtual component(s) (e.g., via a virtual machine(s) executing on a physical processing node (s) in a network(s)). As illustrated, in this example, the radio access node 2000 may include the control system 2002 and/or the one or more radio units 2010, as described above. The control system 2002 may be connected to the radio unit(s) 2010 via, for example, an optical cable or the like. The radio access node 2000 includes one or more processing nodes 2100 coupled to or included as part of a network(s) 2102. If present, the control system 2002 or the radio unit(s) are connected to the processing node(s) 2100 via the network 2102. Each processing node 2100 includes one or more processors 2104 (e.g., CPUs, ASICs, FPGAs, and/or the like), memory 2106, and a network interface 2108.

In this example, functions 2110 of the radio access node 2000 described herein are implemented at the one or more processing nodes 2100 or distributed across the one or more processing nodes 2100 and the control system 2002 and/or the radio unit(s) 2010 in any desired manner. In some particular embodiments, some or all of the functions 2110 of the radio access node 2000 described herein are implemented as virtual components executed by one or more virtual machines implemented in a virtual environment(s) hosted by the processing node(s) 2100. As will be appreciated by one of ordinary skill in the art, additional signaling or communication between the processing node(s) 2100 and the control system 2002 is used in order to carry out at least some of the desired functions 2110. Notably, in some embodiments, the control system 2002 may not be included, in which case the radio unit(s) 2010 communicate directly with the processing node(s) 2100 via an appropriate network interface(s).

In some embodiments, a computer program including instructions which, when executed by at least one processor, causes the at least one processor to carry out the functionality of radio access node 2000 or a node (e.g., a processing node 2100) implementing one or more of the functions 2110 of the radio access node 2000 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 22:
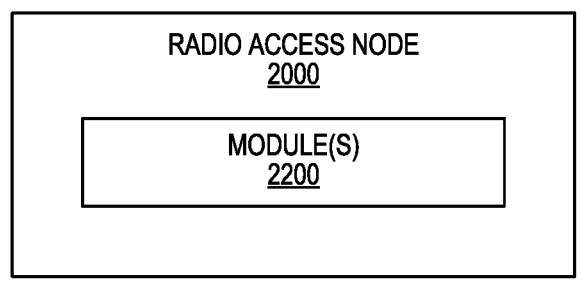
FIG. 22 is a schematic block diagram of the network node, according to some other embodiments of the present disclosure.

FIG. 22 is a schematic block diagram of the radio access node 2000 according to some other embodiments of the present disclosure. The radio access node 2000 includes one or more modules 2200, each of which is implemented in software. The module(s) 2200 provide the functionality of the radio access node 2000 described herein. This discussion is equally applicable to the processing node 2100 of FIG. 21 where the modules 2200 may be implemented at one of the processing nodes 2100 or distributed across multiple processing nodes 2100 and/or distributed across the processing node(s) 2100 and the control system 2002.

Figure 23:
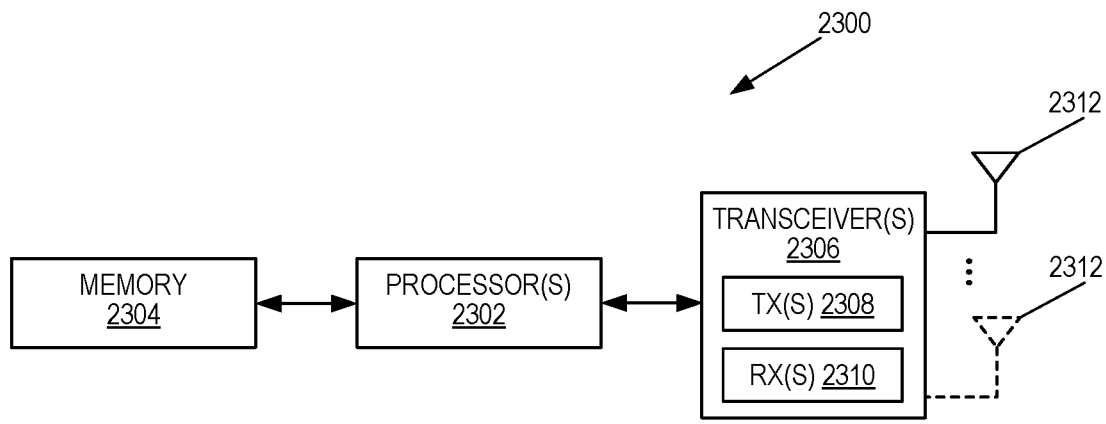
FIG. 23 is a schematic block diagram of a UE, according to some embodiments of the present disclosure.

FIG. 23 is a schematic block diagram of a wireless communication device 2300 according to some embodiments of the present disclosure. As illustrated, the wireless communication device 2300 includes one or more processors 2302 (e.g., CPUs, ASICs, FPGAs, and/or the like), memory 2304, and one or more transceivers 2306 each including one or more transmitters 2308 and one or more receivers 2310 coupled to one or more antennas 2312. The transceiver(s) 2306 includes radio-front end circuitry connected to the antenna(s) 2312 that is configured to condition signals communicated between the antenna(s) 2312 and the processor(s) 2302, as will be appreciated by on of ordinary skill in the art. The processors 2302 are also referred to herein as processing circuitry. The transceivers 2306 are also referred to herein as radio circuitry. In some embodiments, the functionality of the wireless communication device 2300 described above may be fully or partially implemented in software that is, e.g., stored in the memory 2304 and executed by the processor(s) 2302. Note that the wireless communication device 2300 may include additional components not illustrated in FIG. 23 such as, e.g., one or more user interface components (e.g., an input/output interface including a display, buttons, a touch screen, a microphone, a speaker(s), and/or the like and/or any other components for allowing input of information into the wireless communication device 2300 and/or allowing output of information from the wireless communication device 2300), a power supply (e.g., a battery and associated power circuitry), etc.

In some embodiments, a computer program including instructions which, when executed by at least one processor, causes the at least one processor to carry out the functionality of the wireless communication device 2300 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 24:
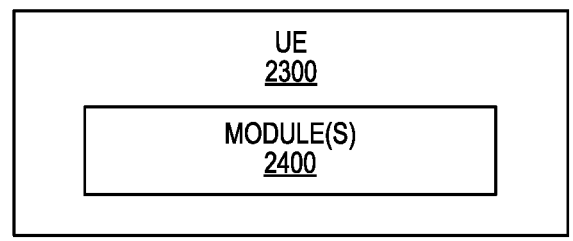
FIG. 24 is a schematic block diagram of the UE, according to some embodiments of the present disclosure.

FIG. 24 is a schematic block diagram of the wireless communication device 2300 according to some other embodiments of the present disclosure. The wireless communication device 2300 includes one or more modules 2400, each of which is implemented in software. The module(s) 2400 provide the functionality of the wireless communication device 2300 described herein.

Figure 25:
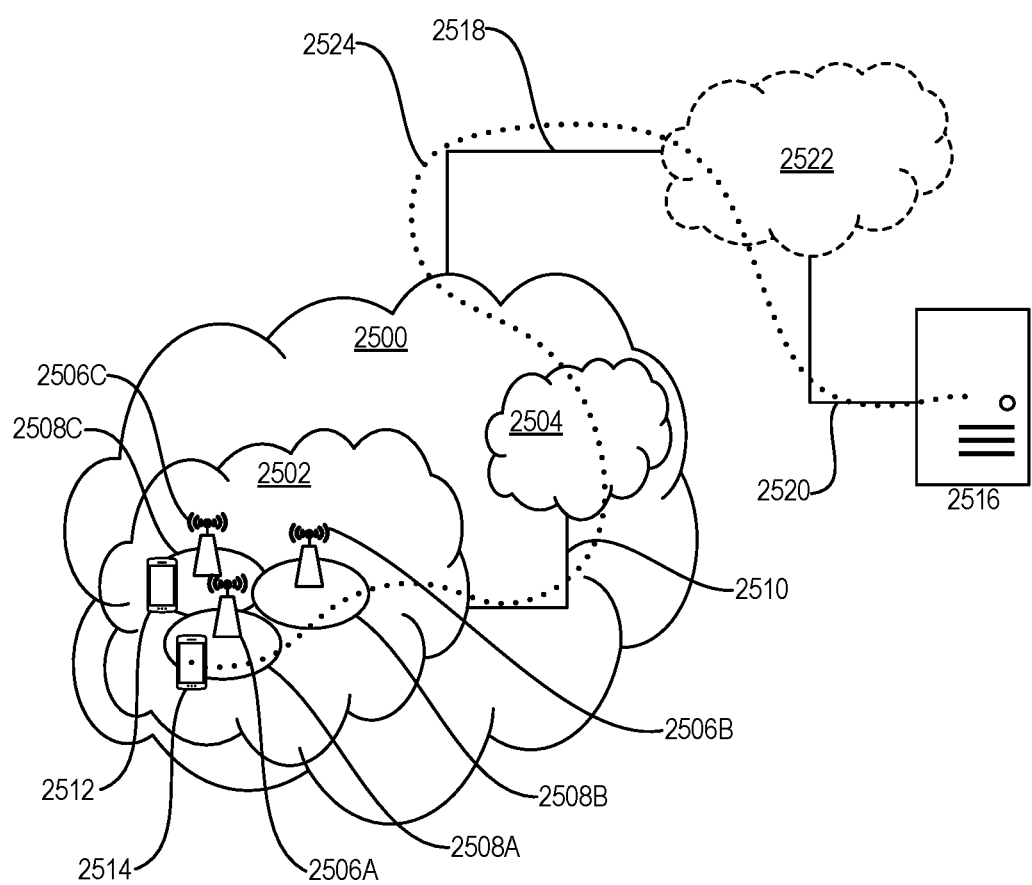
FIGS. 25 and 26 illustrate examples of a cellular communications system, according to some embodiments of the present disclosure.

With reference to FIG. 25, in accordance with an embodiment, a communication system includes a telecommunication network 2500, such as a 3GPP-type cellular network, which comprises an access network 2502, such as a RAN, and a core network 2504. The access network 2502 comprises a plurality of base stations 2506A, 2506B, 2506C, such as Node Bs, eNBs, gNBs, or other types of wireless Access Points (APs), each defining a corresponding coverage area 2508A, 2508B, 2508C. Each base station 2506A, 2506B, 2506C is connectable to the core network 2504 over a wired or wireless connection 2510. A first UE 2512 located in coverage area 2508C is configured to wirelessly connect to, or be paged by, the corresponding base station 2506C. A second UE 2514 in coverage area 2508A is wirelessly connectable to the corresponding base station 2506A. While a plurality of UEs 2512, 2514 are illustrated in this example, the disclosed embodiments are equally applicable to a situation where a sole UE is in the coverage area or where a sole UE is connecting to the corresponding base station 2506.

The telecommunication network 2500 is itself connected to a host computer 2516, which may be embodied in the hardware and/or software of a standalone server, a cloud-implemented server, a distributed server, or as processing resources in a server farm. The host computer 2516 may be under the ownership or control of a service provider, or may be operated by the service provider or on behalf of the service provider. Connections 2518 and 2520 between the telecommunication network 2500 and the host computer 2516 may extend directly from the core network 2504 to the host computer 2516 or may go via an optional intermediate network 2522. The intermediate network 2522 may be one of, or a combination of more than one of, a public, private, or hosted network; the intermediate network 2522, if any, may be a backbone network or the Internet; in particular, the intermediate network 2522 may comprise two or more sub-networks (not shown).

The communication system of FIG. 25 as a whole enables connectivity between the connected UEs 2512, 2514 and the host computer 2516. The connectivity may be described as an Over-the-Top (OTT) connection 2524. The host computer 2516 and the connected UEs 2512, 2514 are configured to communicate data and/or signaling via the OTT connection 2524, using the access network 2502, the core network 2504, any intermediate network 2522, and possible further infrastructure (not shown) as intermediaries. The OTT connection 2524 may be transparent in the sense that the participating communication devices through which the OTT connection 2524 passes are unaware of routing of uplink and downlink communications. For example, the base station 2506 may not or need not be informed about the past routing of an incoming downlink communication with data originating from the host computer 2516 to be forwarded (e.g., handed over) to a connected UE 2512. Similarly, the base station 2506 need not be aware of the future routing of an outgoing uplink communication originating from the UE 2512 towards the host computer 2516.

Example implementations, in accordance with an embodiment, of the UE, base station, and host computer discussed in the preceding paragraphs will now be described with reference to FIG. 26. In a communication system 2600, a host computer 2602 comprises hardware 2604 including a communication interface 2606 configured to set up and maintain a wired or wireless connection with an interface of a different communication device of the communication system 2600. The host computer 2602 further comprises processing circuitry 2608, which may have storage and/or processing capabilities. In particular, the processing circuitry 2608 may comprise one or more programmable processors, ASICs, FPGAs, or combinations of these (not shown) adapted to execute instructions. The host computer 2602 further comprises software 2610, which is stored in or accessible by the host computer 2602 and executable by the processing circuitry 2608. The software 2610 includes a host application 2612. The host application 2612 may be operable to provide a service to a remote user, such as a UE 2614 connecting via an OTT connection 2616 terminating at the UE 2614 and the host computer 2602. In providing the service to the remote user, the host application 2612 may provide user data which is transmitted using the OTT connection 2616.

The communication system 2600 further includes a base station 2618 provided in a telecommunication system and comprising hardware 2620 enabling it to communicate with the host computer 2602 and with the UE 2614. The hardware 2620 may include a communication interface 2622 for setting up and maintaining a wired or wireless connection with an interface of a different communication device of the communication system 2600, as well as a radio interface 2624 for setting up and maintaining at least a wireless connection 2626 with the UE 2614 located in a coverage area (not shown in FIG. 26) served by the base station 2618. The communication interface 2622 may be configured to facilitate a connection 2628 to the host computer 2602. The connection 2628 may be direct or it may pass through a core network (not shown in FIG. 26) of the telecommunication system and/or through one or more intermediate networks outside the telecommunication system. In the embodiment shown, the hardware 2620 of the base station 2618 further includes processing circuitry 2630, which may comprise one or more programmable processors, ASICs, FPGAs, or combinations of these (not shown) adapted to execute instructions. The base station 2618 further has software 2632 stored internally or accessible via an external connection.

The communication system 2600 further includes the UE 2614 already referred to. The UE's 2614 hardware 2634 may include a radio interface 2636 configured to set up and maintain a wireless connection 2626 with a base station serving a coverage area in which the UE 2614 is currently located. The hardware 2634 of the UE 2614 further includes processing circuitry 2638, which may comprise one or more programmable processors, ASICs, FPGAs, or combinations of these (not shown) adapted to execute instructions. The UE 2614 further comprises software 2640, which is stored in or accessible by the UE 2614 and executable by the processing circuitry 2638. The software 2640 includes a client application 2642. The client application 2642 may be operable to provide a service to a human or non-human user via the UE 2614, with the support of the host computer 2602. In the host computer 2602, the executing host application 2612 may communicate with the executing client application 2642 via the OTT connection 2616 terminating at the UE 2614 and the host computer 2602. In providing the service to the user, the client application 2642 may receive request data from the host application 2612 and provide user data in response to the request data. The OTT connection 2616 may transfer both the request data and the user data. The client application 2642 may interact with the user to generate the user data that it provides.

Figure 26:
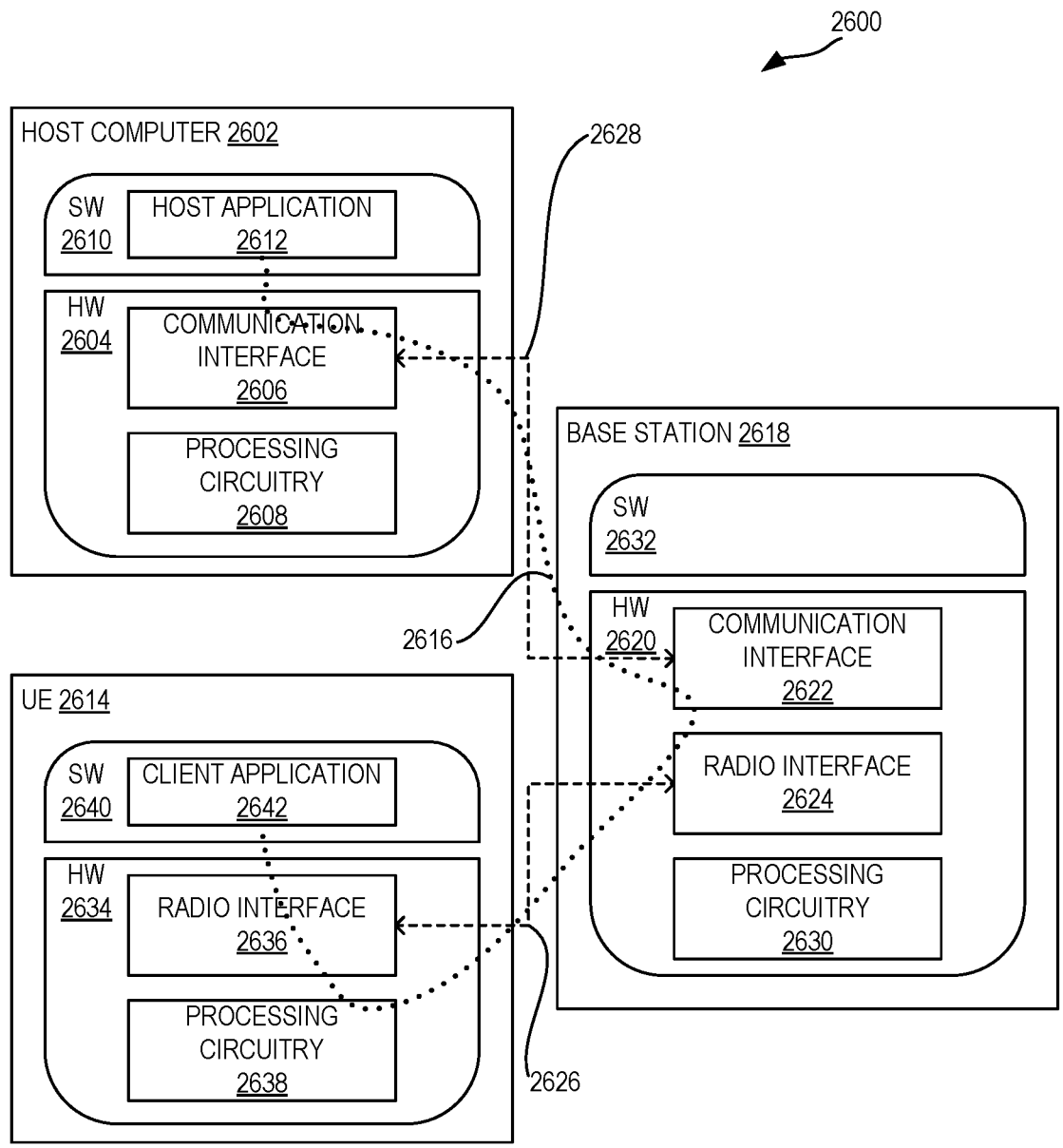

It is noted that the host computer 2602, the base station 2618, and the UE 2614 illustrated in FIG. 26 may be similar or identical to the host computer 2516, one of the base stations 2506A, 2506B, 2506C, and one of the UEs 2512, 2514 of FIG. 25, respectively. This is to say, the inner workings of these entities may be as shown in FIG. 26 and independently, the surrounding network topology may be that of FIG. 25.

In FIG. 26, the OTT connection 2616 has been drawn abstractly to illustrate the communication between the host computer 2602 and the UE 2614 via the base station 2618 without explicit reference to any intermediary devices and the precise routing of messages via these devices. The network infrastructure may determine the routing, which may be configured to hide from the UE 2614 or from the service provider operating the host computer 2602, or both. While the OTT connection 2616 is active, the network infrastructure may further take decisions by which it dynamically changes the routing (e.g., on the basis of load balancing consideration or reconfiguration of the network).

The wireless connection 2626 between the UE 2614 and the base station 2618 is in accordance with the teachings of the embodiments described throughout this disclosure. One or more of the various embodiments improve the performance of OTT services provided to the UE 2614 using the OTT connection 2616, in which the wireless connection 2626 forms the last segment. More precisely, the teachings of these embodiments may improve the e.g., data rate, latency, power consumption, etc. and thereby provide benefits such as e.g., reduced user waiting time, relaxed restriction on file size, better responsiveness, extended battery lifetime, etc.

A measurement procedure may be provided for the purpose of monitoring data rate, latency, and other factors on which the one or more embodiments improve. There may further be an optional network functionality for reconfiguring the OTT connection 2616 between the host computer 2602 and the UE 2614, in response to variations in the measurement results. The measurement procedure and/or the network functionality for reconfiguring the OTT connection 2616 may be implemented in the software 2610 and the hardware 2604 of the host computer 2602 or in the software 2640 and the hardware 2634 of the UE 2614, or both. In some embodiments, sensors (not shown) may be deployed in or in association with communication devices through which the OTT connection 2616 passes; the sensors may participate in the measurement procedure by supplying values of the monitored quantities exemplified above, or supplying values of other physical quantities from which the software 2610, 2640 may compute or estimate the monitored quantities. The reconfiguring of the OTT connection 2616 may include message format, retransmission settings, preferred routing, etc.; the reconfiguring need not affect the base station 2618, and it may be unknown or imperceptible to the base station 2618. Such procedures and functionalities may be known and practiced in the art. In certain embodiments, measurements may involve proprietary UE signaling facilitating the host computer 2602's measurements of throughput, propagation times, latency, and the like. The measurements may be implemented in that the software 2610 and 2640 causes messages to be transmitted, in particular empty or 'dummy' messages, using the OTT connection 2616 while it monitors propagation times, errors, etc.

Figures 27, 28:
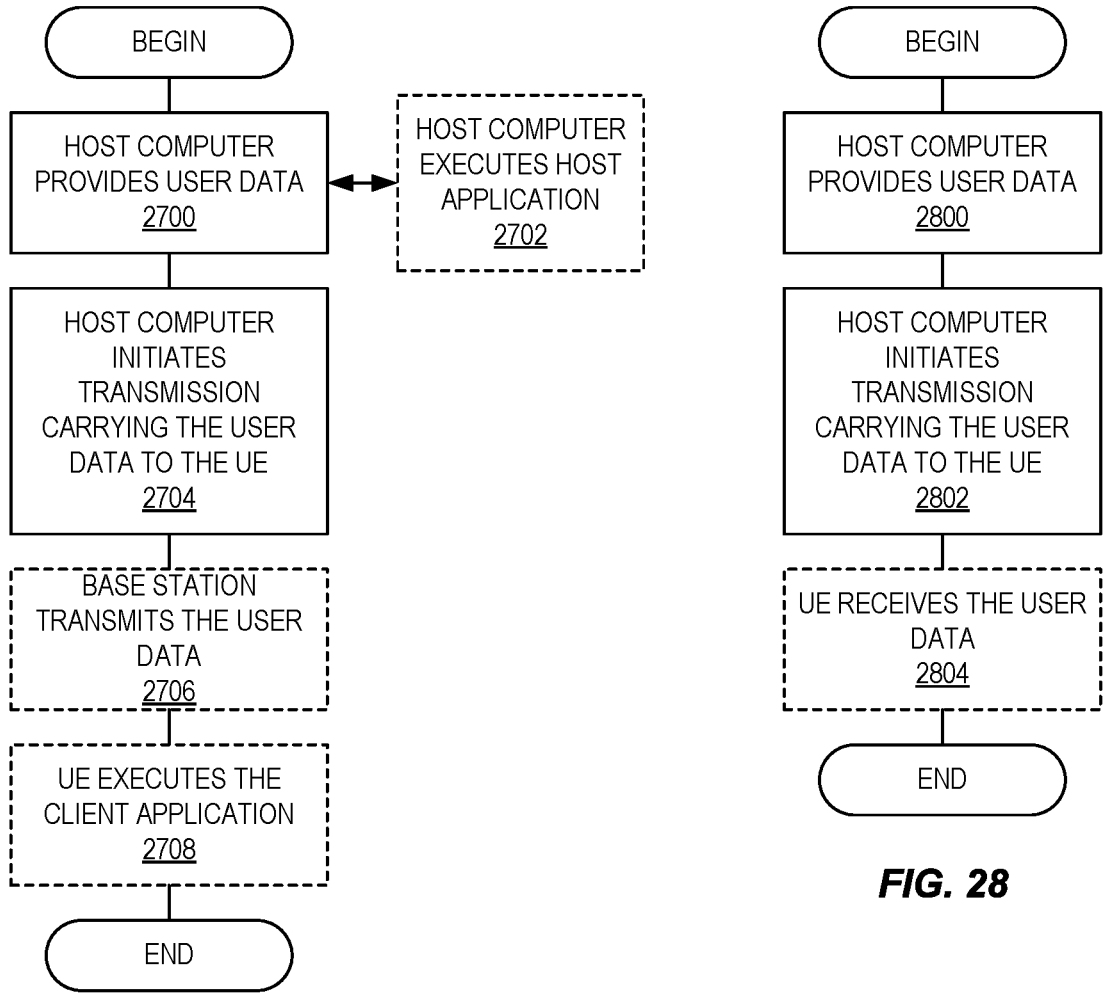

FIG. 27 is a flowchart illustrating a method implemented in a communication system, in accordance with one embodiment. The communication system includes a host computer, a base station, and a UE which may be those described with reference to FIGS. 25 and 26. For simplicity of the present disclosure, only drawing references to FIG. 27 will be included in this section. In step 2700, the host computer provides user data. In sub-step 2702 (which may be optional) of step 2700, the host computer provides the user data by executing a host application. In step 2704, the host computer initiates a transmission carrying the user data to the UE. In step 2706 (which may be optional), the base station transmits to the UE the user data which was carried in the transmission that the host computer initiated, in accordance with the teachings of the embodiments described throughout this disclosure. In step 2708 (which may also be optional), the UE executes a client application associated with the host application executed by the host computer.

FIG. 28 is a flowchart illustrating a method implemented in a communication system, in accordance with one embodiment. The communication system includes a host computer, a base station, and a UE which may be those described with reference to FIGS. 25 and 26. For simplicity of the present disclosure, only drawing references to FIG. 28 will be included in this section. In step 2800 of the method, the host computer provides user data. In an optional sub-step (not shown) the host computer provides the user data by executing a host application. In step 2802, the host computer initiates a transmission carrying the user data to the UE. The transmission may pass via the base station, in accordance with the teachings of the embodiments described throughout this disclosure. In step 2804 (which may be optional), the UE receives the user data carried in the transmission.

FIG. 29 is a flowchart illustrating a method implemented in a communication system, in accordance with one embodiment. The communication system includes a host computer, a base station, and a UE which may be those described with reference to FIGS. 25 and 26. For simplicity of the present disclosure, only drawing references to FIG. 29 will be included in this section. In step 2900 (which may be optional), the UE receives input data provided by the host computer. Additionally or alternatively, in step 2902, the UE provides user data. In sub-step 2904 (which may be optional) of step 2900, the UE provides the user data by executing a client application. In sub-step 2906 (which may be optional) of step 2902, the UE executes a client application which provides the user data in reaction to the received input data provided by the host computer. In providing the user data, the executed client application may further consider user input received from the user. Regardless of the specific manner in which the user data was provided, the UE initiates, in sub-step 2908 (which may be optional), transmission of the user data to the host computer.

In step 2910 of the method, the host computer receives the user data transmitted from the UE, in accordance with the teachings of the embodiments described throughout this disclosure.

FIG. 30 is a flowchart illustrating a method implemented in a communication system, in accordance with one embodiment. The communication system includes a host computer, a base station, and a UE which may be those described with reference to FIGS. 25 and 26. For simplicity of the present disclosure, only drawing references to FIG. 30 will be included in this section. In step 3000 (which may be optional), in accordance with the teachings of the embodiments described throughout this disclosure, the base station receives user data from the UE. In step 3002 (which may be optional), the base station initiates transmission of the received user data to the host computer. In step 3004 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

EMBODIMENTS

Group A Embodiments

Embodiment 1: A method performed by a wireless device for determining a start symbol of a plurality of PDSCH transmission occasions within a slot using a relative reference symbol, the method comprising one or more of: receiving (900) an indication that comprises one or more of the group consisting of: i. an indication that enables/disables the use of the relative reference symbol S0 as the reference point for indicating the starting symbol; ii. an indication from the network of at least one offset value K which is the offset between the last symbol of a first PDSCH transmission occasion and the first symbol of a second PDSCH transmission occasion; iii. an indication from the network that there are multiple PDSCH transmission occasions; and iv. an indication that a symbol S of the first transmission occasion and length L corresponding to all transmission occasions; and/or determining (902) the symbol at which each of the plurality of PDSCH transmission occasions end which will be used to determine how many of the PDSCH transmission occasions are received by the wireless device.

Embodiment 2: The method of embodiment 1 wherein receiving the indication comprises receiving the indication via RRC signaling.

Embodiment 3: The method of any of embodiments 1 to 2 wherein receiving the indication comprises receiving the indication via a TCI field in DCI which indicates the multiple transmission occasions when there are more than one TCI state indicated by a codepoint in the TCI field.

Embodiment 4: The method of embodiment 3 wherein each transmission occasion is associated with one of the TCI states indicated by the codepoint in the TCI field.

Embodiment 5: The method of any of embodiments 1 to 2 wherein receiving the indication comprises receiving the indication via the TCI field in DCI which indicates the multiple transmission occasions when there is one TCI state indicated by a codepoint in the TCI field.

Embodiment 6: The method of embodiment 5 wherein all transmission occasions are associated with the one TCI state indicated by the codepoint in the TCI field.

Embodiment 7: The method of any of embodiments 1 to 6 wherein receiving the indication comprises receiving the indication via a TDRA field in DCI.

Embodiment 8: The method of any of embodiments 1 to 7 wherein the wireless device receives only the PDSCH transmission occasions that end on or before the slot boundary.

Embodiment 9: The method of any of embodiments 1 to 7 wherein the wireless device does not receive any of the PDSCH transmission occasions if at least one of the PDSCH transmission occasions crosses the slot boundary.

Embodiment 10: The method of any of embodiments 1 to 7 wherein the wireless device fully receives the PDSCH transmission occasions that end on or before the slot boundary, and delays the PDSCH transmission occasions that cross the slot boundary to the next slot.

Embodiment 11: The method of any of embodiments 1 to 7 wherein the wireless device fully receives the PDSCH transmission occasions that end on or before the slot boundary, and shortens the PDSCH transmission occasions that cross the slot boundary.

Embodiment 12: The method of any of embodiments 1 to 7 wherein the wireless device fully receives the PDSCH transmission occasions that end on or before the slot boundary, and fully receives the PDSCH transmission occasions that cross the slot boundary under certain conditions.

Embodiment 13: The method of embodiment 12 wherein the certain conditions include if the excess symbols that crosses into the next slot does not contain a monitoring occasion, a configured TRS or other periodic CSI-RS, a configured LTE CRS rate matching pattern or other reserved resources.

Embodiment 14: The method of any of embodiments 1 to 13 wherein the determining of the symbol at which each of the plurality of PDSCH transmission occasions end and the subsequent determining of how many of the PDSCH transmission occasions are received at the UE are conditioned one or both of the following: whether the use of the relative reference symbol S0 as the reference point for indicating the starting symbol is enabled or disabled; and the value of the offset K.

Embodiment 15: The method of any of the previous embodiments, further comprising: providing user data; and forwarding the user data to a host computer via the transmission to the base station.

Group B Embodiments

Embodiment 16: A method performed by a base station for indicating a start symbol of a plurality of PDSCH transmission occasions within a slot using a relative reference symbol, the method comprising: transmitting (1000) an indication that comprises one or more of the group consisting of: an indication that enables/disables the use of the relative reference symbol S0 as the reference point for indicating the starting symbol; ii. an indication of at least one offset value K which is the offset between the last symbol of a first PDSCH transmission occasion and the first symbol of a second PDSCH transmission occasion; iii. an indication from the network that there are multiple PDSCH transmission occasions; and iv. an indication that a symbol S of the first transmission occasion and length L corresponding to all transmission occasions.

Embodiment 17: The method of embodiment 16 wherein transmitting the indication comprises transmitting the indication via RRC signaling.

Embodiment 18: The method of any of embodiments 16 to 17 wherein transmitting the indication comprises transmitting the indication via a TCI field in DCI which indicates the multiple transmission occasions when there are more than one TCI state indicated by a codepoint in the TCI field.

Embodiment 19: The method of embodiment 18 wherein each transmission occasion is associated with one of the TCI states indicated by the codepoint in the TCI field.

Embodiment 20: The method of any of embodiments 16 to 17 wherein transmitting the indication comprises transmitting the indication via the TCI field in DCI which indicates the multiple transmission occasions when there is one TCI state indicated by a codepoint in the TCI field.

Embodiment 21: The method of embodiment 20 wherein all transmission occasions are associated with the one TCI state indicated by the codepoint in the TCI field.

Embodiment 22: The method of any of embodiments 16 to 21 wherein transmitting the indication comprises receiving the indication via a TDRA field in DCI.

Embodiment 23: The method of any of embodiments 16 to 22 wherein the wireless device receives only the PDSCH transmission occasions that end on or before the slot boundary.

Embodiment 24: The method of any of embodiments 16 to 22 wherein the wireless device does not receive any of the PDSCH transmission occasions if at least one of the PDSCH transmission occasions crosses the slot boundary.

Embodiment 25: The method of any of embodiments 16 to 22 wherein the wireless device fully receives the PDSCH transmission occasions that end on or before the slot boundary, and delays the PDSCH transmission occasions that cross the slot boundary to the next slot.

Embodiment 26: The method of any of embodiments 16 to 22 wherein the wireless device fully receives the PDSCH transmission occasions that end on or before the slot boundary, and shortens the PDSCH transmission occasions that cross the slot boundary.

Embodiment 27: The method of any of embodiments 16 to 22 wherein the wireless device fully receives the PDSCH transmission occasions that end on or before the slot boundary, and fully receives the PDSCH transmission occasions that cross the slot boundary under certain conditions.

Embodiment 28: The method of embodiment 27 wherein the certain conditions include if the excess symbols that crosses into the next slot does not contain a monitoring occasion, a configured TRS or other periodic CSI-RS, a configured LTE CRS rate matching pattern or other reserved resources.

Embodiment 29: The method of any of the previous embodiments, further comprising: obtaining user data; and forwarding the user data to a host computer or a wireless device.

Group C Embodiments

Embodiment 30: A wireless device for determining a start symbol of a plurality of PDSCH transmission occasions within a slot using a relative reference symbol, the wireless device comprising: processing circuitry configured to perform any of the steps of any of the Group A embodiments; and power supply circuitry configured to supply power to the wireless device.

Embodiment 31: A base station for indicating a start symbol of a plurality of PDSCH transmission occasions within a slot using a relative reference symbol, the base station comprising: processing circuitry configured to perform any of the steps of any of the Group B embodiments; and power supply circuitry configured to supply power to the base station.

Embodiment 32: A User Equipment, UE, for determining a start symbol of a plurality of PDSCH transmission occasions within a slot using a relative reference symbol, the UE comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Embodiment 33: A communication system including a host computer comprising: processing circuitry configured to provide user data; and a communication interface configured to forward the user data to a cellular network for transmission to a User Equipment, UE; wherein the cellular network comprises a base station having a radio interface and processing circuitry, the base station's processing circuitry configured to perform any of the steps of any of the Group B embodiments.

Embodiment 34: The communication system of the previous embodiment further including the base station.

Embodiment 35: The communication system of the previous 2 embodiments, further including the UE, wherein the UE is configured to communicate with the base station.

Embodiment 36: The communication system of the previous 3 embodiments, wherein: the processing circuitry of the host computer is configured to execute a host application, thereby providing the user data; and the UE comprises processing circuitry configured to execute a client application associated with the host application.

Embodiment 37: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the base station performs any of the steps of any of the Group B embodiments.

Embodiment 38: The method of the previous embodiment, further comprising, at the base station, transmitting the user data.

Embodiment 39: The method of the previous 2 embodiments, wherein the user data is provided at the host computer by executing a host application, the method further comprising, at the UE, executing a client application associated with the host application.

Embodiment 40: A User Equipment, UE, configured to communicate with a base station, the UE comprising a radio interface and processing circuitry configured to perform the method of the previous 3 embodiments.

Embodiment 41: A communication system including a host computer comprising: processing circuitry configured to provide user data; and a communication interface configured to forward user data to a cellular network for transmission to a User Equipment, UE; wherein the UE comprises a radio interface and processing circuitry, the UE's components configured to perform any of the steps of any of the Group A embodiments.

Embodiment 42: The communication system of the previous embodiment, wherein the cellular network further includes a base station configured to communicate with the UE.

Embodiment 43: The communication system of the previous 2 embodiments, wherein: the processing circuitry of the host computer is configured to execute a host application, thereby providing the user data; and the UE's processing circuitry is configured to execute a client application associated with the host application.

Embodiment 44: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the UE performs any of the steps of any of the Group A embodiments.

Embodiment 45: The method of the previous embodiment, further comprising at the UE, receiving the user data from the base station.

Embodiment 46: A communication system including a host computer comprising: communication interface configured to receive user data originating from a transmission from a User Equipment, UE, to a base station; wherein the UE comprises a radio interface and processing circuitry, the UE's processing circuitry configured to perform any of the steps of any of the Group A embodiments.

Embodiment 47: The communication system of the previous embodiment, further including the UE.

Embodiment 48: The communication system of the previous 2 embodiments, further including the base station, wherein the base station comprises a radio interface configured to communicate with the UE and a communication interface configured to forward to the host computer the user data carried by a transmission from the UE to the base station.

Embodiment 49: The communication system of the previous 3 embodiments, wherein: the processing circuitry of the host computer is configured to execute a host application; and the UE's processing circuitry is configured to execute a client application associated with the host application, thereby providing the user data.

Embodiment 50: The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

Embodiment 51: A method implemented in a communication system including a host computer, a base station, and a User Equipment, UE, the method comprising: at the host computer, receiving user data transmitted to the base station from the UE, wherein the UE performs any of the steps of any of the Group A embodiments.

Embodiment 52: The method of the previous embodiment, further comprising, at the UE, providing the user data to the base station.

Embodiment 53: The method of the previous 2 embodiments, further comprising: at the UE, executing a client application, thereby providing the user data to be transmitted; and at the host computer, executing a host application associated with the client application.

Embodiment 54: The method of the previous 3 embodiments, further comprising: at the UE, executing a client application; and at the UE, receiving input data to the client application, the input data being provided at the host computer by executing a host application associated with the client application; wherein the user data to be transmitted is provided by the client application in response to the input data.

Embodiment 55: A communication system including a host computer comprising a communication interface configured to receive user data originating from a transmission from a User Equipment, UE, to a base station, wherein the base station comprises a radio interface and processing circuitry, the base station's processing circuitry configured to perform any of the steps of any of the Group B embodiments.

Embodiment 56: The communication system of the previous embodiment further including the base station.

Embodiment 57: The communication system of the previous 2 embodiments, further including the UE, wherein the UE is configured to communicate with the base station.

Embodiment 58: The communication system of the previous 3 embodiments, wherein: the processing circuitry of the host computer is configured to execute a host application; and the UE is configured to execute a client application associated with the host application, thereby providing the user data to be received by the host computer.

Embodiment 59: A method implemented in a communication system including a host computer, a base station, and a User Equipment, UE, the method comprising: at the host computer, receiving, from the base station, user data originating from a transmission which the base station has received from the UE, wherein the UE performs any of the steps of any of the Group A embodiments.

Embodiment 60: The method of the previous embodiment, further comprising at the base station, receiving the user data from the UE.

Embodiment 61: The method of the previous 2 embodiments, further comprising at the base station, initiating a transmission of the received user data to the host computer.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core
5GS Fifth Generation System
AF Application Function
AMF Access and Mobility Function
AN Access Network
AP Access Point
ASIC Application Specific Integrated Circuit
AUSF Authentication Server Function
BS Base Station
CDM Code Division Multiplexing
CORESET Control Resource Set
CPU Central Processing Unit
CRS Cell Specific Reference Signal
CSI-RS Channel State Information Reference Signal
D2D Device to Device
DCI Downlink Control Information
DFT-S-OFDM Discrete Fourier Transform Spread Orthogonal Frequency Division Multiplexing
DL Downlink
DMRS Demodulation Reference Signal
DN Data Network
DSP Digital Signal Processor
eMBB Enhanced Mobile Broadband
eNB Enhanced or Evolved Node B
EPC Evolved Packet Core
EPS Evolved Packet System
E-UTRA Evolved Universal Terrestrial Radio Access
FFS For Further Study
FPGA Field Programmable Gate Array
FR Frequency Range
gNB New Radio Base Station
gNB-CU New Radio Base Station Central Unit
gNB-DU New Radio Base Station Distributed Unit
HSS Home Subscriber Server
IE Information Element
IoT Internet of Things
IP Internet Protocol
LTE Long Term Evolution
M2M Machine to Machine
MCS Modulation and Coding Scheme
MME Mobility Management Entity
MSR Multi-Standard Radio
MTC Machine Type Communication
NB-IoT Marrowband Internet of Things
NEF Network Exposure Function
NF Network Function
NR New Radio
NRF Network Function Repository Function
NR-U New Radio over Unlicensed Spectrum
NSSF Network Slice Selection Function
OCC Orthogonal Cover Code
OFDM Orthogonal Frequency Division Multiplexing
OTT Over-the-Top
PC Personal Computer
PCF Policy Control Function
PDCCH Physical Downlink Control Channel
PDCH Physical Data Channel
PDSCH Physical Downlink Shared Channel
P-GW Packet Data Network Gateway
PUSCH Physical Uplink Shared Channel
QCL Quasi Co-Located
QoS Quality of Service
RAM Random Access Memory
RAN Radio Access Network
RB Resource Block
RE Resource Element
RNTI Radio Network Temporary Identifier
ROM Read Only Memory
RRC Radio Resource Control
RRH Remote Radio Head
RS Reference Signal
RTT Round Trip Time
SCEF Service Capability Exposure Function
SINR Signal to Interference Plus Noise Ratio
SLIV Start and Length Indicator
SMF Session Management Function
SPS Semi Persistent Scheduling
SS Synchronization Signal
TB Transport Block
TCI Transmission Configuration Indicator
TDD Time Division Multiplexing
TDRA Time Domain Resource Allocation
TRP Transmission Point
TRS Tracking Reference Signal
UDM Unified Data Management
UE User Equipment
UPF User Plane Function
URLLC Ultra-Reliable Low Latency Communication Those skilled in the art will recognize improvements and modifications to the embodiments of the present disclosure. All such improvements and modifications are considered within the scope of the concepts disclosed herein.

What is claimed is:

1. A method performed by a wireless device for determining a start symbol of a plurality of Physical Downlink Shared Channel, PDSCH, transmission occasions within a slot using a relative reference symbol, the method comprising:
   receiving an indication that comprises:
      an indication that enables/disables use of a relative reference symbol $S_0$ as a reference point for indicating the start symbol;
      an indication from a network of at least one offset value K which is an offset between a last symbol of a first PDSCH transmission occasion and a first symbol of a second PDSCH transmission occasion;
      an indication from the network that there are multiple PDSCH transmission occasions; and
      an indication that a symbol, S, of the first PDSCH transmission occasion and length, L, correspond to all PDSCH transmission occasions; and
   determining the symbol at which each of the plurality of PDSCH transmission occasions end which will be used to determine the starting symbol of a next PDSCH transmission occasion by the wireless device;
   wherein determining the symbol is only applicable for wireless device specific Radio Network Temporary Identifiers, RNTIs.

2. The method of claim 1 wherein receiving the indication comprises receiving the indication via Radio Resource Control, RRC, signaling.

3. The method of claim 1 wherein receiving the indication comprises receiving the indication via a Transmission Configuration Indicator, TCI, field in a Downlink Control Information, DCI, which indicates the multiple PDSCH transmission occasions when more than one TCI state is indicated by a codepoint in the TCI field.

4. The method of claim 3 wherein each PDSCH transmission occasion is associated with one of the TCI states indicated by the codepoint in the TCI field.

5. The method of claim 1 wherein receiving the indication comprises receiving the indication via a Transmission Configuration Indicator, TCI, field in a Downlink Control Information, DCI, which indicates the multiple PDSCH transmission occasions when there is one TCI state indicated by a codepoint in the TCI field.

6. The method of claim 5 wherein all PDSCH transmission occasions are associated with the one TCI state indicated by the codepoint in the TCI field.

7. The method of claim 1 wherein receiving the indication comprises receiving the indication via a Time Domain Resource Allocation, TDRA, field in the DCI.

8. The method of claim 1 wherein the wireless device receives only PDSCH transmission occasions that end on or before a slot boundary.

9. The method of claim 1 wherein the wireless device does not receive any of the multiple PDSCH transmission occasions if at least one of the PDSCH transmission occasions crosses a slot boundary.

10. The method of claim 1 wherein the wireless device fully receives PDSCH transmission occasions that end on or before a slot boundary, and delays PDSCH transmission occasions that cross the slot boundary to a next slot.

11. The method of claim 1 wherein the wireless device fully receives PDSCH transmission occasions that end on or before a slot boundary, and shortens PDSCH transmission occasions that cross the slot boundary.

12. The method of claim 1 wherein the wireless device fully receives PDSCH transmission occasions that end on or before a slot boundary, and fully receives PDSCH transmission occasions that cross the slot boundary under certain conditions.

13. The method of claim 12 wherein the certain conditions include if excess symbols that cross into a next slot do not contain one or more of the group consisting of:
a monitoring occasion; a configured Tracking Reference Signal, TRS, or other periodic Channel State Information-Reference Signal, CSI-RS; a configured Long-Term Evolution, LTE, Cell Specific Reference Signal, CRS, rate matching pattern; and other reserved resources.

14. The method of claim 1 wherein the determining of the symbol at which each of the plurality of PDSCH transmission occasions end and the subsequent determining of the start of the next PDSCH transmission occasions are received by the wireless device are conditioned on one or more of the group consisting of:
whether use of the relative reference symbol, $S_0$, as the reference point for indicating the starting symbol is enabled or disabled;
the value of start symbol S of the first PDSCH transmission occasion;
the value of length L; and
the value of the offset K.

15. The method of claim 1 wherein determining the symbol at which each of the plurality of PDSCH transmission occasions end comprises:
determining that the PDSCH transmission starts at symbol ($S_0$+S), and ends at symbol ($S_0$+S+(M−1)*K+ M*L), where S is an indicated start symbol relative to symbol $S_0$; L is a duration of one PDSCH transmission occasion; M is a number of PDSCH transmission occasions within each slot; and each adjacent PDSCH transmission occasion is separated by K (K>=0) symbols.

16. The method of claim 1 further comprising:
receiving an indication to activate a Downlink, DL, Semi-Persistent Scheduling, SPS, configuration, the indication using a TDRA with relative reference $S_0$>=0; and
receiving a repeated PDSCH in a subsequent period according to time domain resources as activated.

17. The method of claim 16 wherein, for the DL SPS transmission, either a single transmission point, TRP, or multi-TRP can be used to transmit the PDSCH.

18. The method of claim 1 wherein, a PDSCH repetition that crosses a slot boundary is considered invalid and assumed to be dropped.

19. The method of claim 1 wherein determining the symbol is only applicable for certain DCI formats but not for other DCI formats.

20. The method of claim 1 wherein determining the symbol is only applicable for a Control Resource Set, CORESET, associated with certain controlResourceSetId.

21. A method performed by a base station for indicating a start symbol of a plurality of Physical Downlink Shared Channel, PDSCH, transmission occasions within a slot using a relative reference symbol, the method comprising:
transmitting an indication that comprises:
an indication that enables/disables use of a relative reference symbol $S_0$ as a reference point for indicating the start symbol;
an indication of at least one offset value K which is an offset between a last symbol of a first PDSCH transmission occasion and a first symbol of a second PDSCH transmission occasion;
an indication from a network that there are multiple PDSCH transmission occasions; and
an indication that a symbol S of the first PDSCH transmission occasion and length L correspond to all PDSCH transmission occasions;
wherein determining the symbol is only applicable for wireless device specific Radio Network Temporary Identifiers, RNTIs.

22. The method of claim 21 wherein transmitting the indication comprises transmitting the indication via Radio Resource Control, RRC, signaling.

23. The method of claim 21 wherein transmitting the indication comprises transmitting the indication via a Transmission Configuration Indicator, TCI, field in a Downlink Control Information, DCI, which indicates the multiple PDSCH transmission occasions when more than one TCI state is indicated by a codepoint in the TCI field.

24. A wireless device for validating one or more parameters, the wireless device comprising:
one or more processors; and
memory storing instructions executable by the one or more processors, whereby the wireless device is operable to:
receive an indication that comprises:
an indication that enables/disables use of a relative reference symbol $S_0$ as a reference point for indicating a starting symbol;
an indication from a network of at least one offset value K which is an offset between a last symbol of a first PDSCH transmission occasion and a first symbol of a second PDSCH transmission occasion;
an indication from the network that there are multiple PDSCH transmission occasions; and
an indication that a symbol, S, of the first PDSCH transmission occasion and length, L, correspond to all PDSCH transmission occasions; and determine the symbol at which each of the plurality of PDSCH transmission occasions end which will be used to determine a start of the next PDSCH transmission occasion by the wireless device;

wherein determining the symbol is only applicable for wireless device specific Radio Network Temporary Identifiers, RNTIs.

25. A base station for configuring one or more parameters, the base station comprising:

one or more processors; and memory comprising instructions to cause the base station to:

transmit an indication that comprises:

an indication that enables/disables use of a relative reference symbol $S_0$ as a reference point for indicating a starting symbol;

an indication of at least one offset value K which is an offset between a last symbol of a first PDSCH transmission occasion and a first symbol of a second PDSCH transmission occasion;

an indication from a network that there are multiple PDSCH transmission occasions; and an indication that a symbol S of the first PDSCH transmission occasion and length L corresponding to all PDSCH transmission occasions;

wherein determining the symbol is only applicable for wireless device specific Radio Network Temporary Identifiers, RNTIs.

* * * * *